US009011049B2

(12) United States Patent
Fang et al.

(10) Patent No.: US 9,011,049 B2
(45) Date of Patent: Apr. 21, 2015

(54) DOUBLE-SIDED CUTTING INSERTS WITH ANTI-ROTATION FEATURES

(71) Applicant: Kennametal Inc., Latrobe, PA (US)

(72) Inventors: X. Daniel Fang, Brentwood, TN (US); Jean-Luc Dufour, Franklin, TN (US); David J. Wills, Franklin, TN (US)

(73) Assignee: Kennametal Inc., Pittsburgh, PA (US)

( * ) Notice: Subject to any disclaimer, the term of this patent is extended or adjusted under 35 U.S.C. 154(b) by 207 days.

(21) Appl. No.: 13/625,960

(22) Filed: Sep. 25, 2012

(65) Prior Publication Data

US 2014/0086696 A1   Mar. 27, 2014

(51) Int. Cl.
B23C 5/00   (2006.01)
B23C 5/22   (2006.01)
B23C 5/16   (2006.01)

(52) U.S. Cl.
CPC ......... *B23C 5/2221* (2013.01); *B23C 2200/045* (2013.01); *B23C 2200/161* (2013.01); *B23C 2200/168* (2013.01); *B23C 2210/168* (2013.01); *B23C 2210/66* (2013.01); *Y10T 407/2266* (2015.01); *Y10T 407/2274* (2015.01); *Y10T 407/23* (2015.01); *Y10T 407/235* (2015.01); *Y10T 409/303752* (2015.01)

(58) Field of Classification Search
USPC .......................................... 407/103, 113, 114
See application file for complete search history.

(56) References Cited

U.S. PATENT DOCUMENTS

| 1,838,520 A | 12/1931 | Archer |
| 3,399,442 A | 9/1968 | Jones et al. |
| 3,557,416 A | 1/1971 | Jones |
| 3,621,549 A | 11/1971 | Billups |
| 3,805,349 A | 4/1974 | Nose |
| 3,806,713 A | 4/1974 | Ryberg |
| 4,274,766 A | 6/1981 | Raupp, Jr. et al. |
| 4,294,565 A | 10/1981 | Erkfritz |
| 4,395,186 A | 7/1983 | Whyte |
| 4,412,763 A | 11/1983 | Shallenberger, Jr. |
| 4,461,602 A | 7/1984 | Zettl |
| 4,493,596 A | 1/1985 | Grunsky et al. |
| 4,595,322 A | 6/1986 | Clement |

(Continued)

FOREIGN PATENT DOCUMENTS

| CN | 1130884 A | 9/1996 |
| CN | 1171314 A | 1/1998 |

(Continued)

OTHER PUBLICATIONS 11-07-2013-K-4558USWO1-TMP-2222CIPPCT-Search_Report.

(Continued)

*Primary Examiner* — Will Fridie, Jr.
(74) *Attorney, Agent, or Firm* — Larry R. Meenan

(57) ABSTRACT

A double-sided cutting insert may generally comprise a top surface, a bottom surface, at least one side surface interconnecting the top surface and the bottom surface and forming at least one cutting edge, a through hole extending between the top surface and bottom surface, wherein each of the top surface and bottom surface comprise at least one anti-rotation element. The cutting insert may comprise a single anti-rotation element on the top surface and a single anti-rotation element on the bottom surface. The anti-rotation element may be proximate to the through hole. A cutting tool using the cutting inserts, as well as methods of making and using the same are also described.

17 Claims, 14 Drawing Sheets

(56) References Cited

U.S. PATENT DOCUMENTS

| | | | |
|---|---|---|---|
| 4,659,264 A | 4/1987 | Friedline | |
| 4,679,968 A | 7/1987 | Tsujimura et al. | |
| 4,681,488 A | 7/1987 | Markusson | |
| 4,699,549 A | 10/1987 | Shimomura et al. | |
| 4,760,548 A | 7/1988 | Baker et al. | |
| 4,898,499 A | 2/1990 | Tsujimura et al. | |
| 4,919,573 A | 4/1990 | Tsujimura et al. | |
| 4,940,369 A | 7/1990 | Aebi et al. | |
| 5,052,863 A | 10/1991 | Satran | |
| 5,071,292 A | 12/1991 | Satran | |
| 5,092,718 A | 3/1992 | Shallenberger | |
| 5,094,572 A | 3/1992 | Alsbury et al. | |
| 5,137,398 A | 8/1992 | Omori et al. | |
| 5,145,294 A | 9/1992 | Flueckiger | |
| 5,145,295 A | 9/1992 | Satran | |
| 5,193,946 A | 3/1993 | Arai et al. | |
| 5,203,649 A | 4/1993 | Katbi et al. | |
| 5,226,761 A | 7/1993 | Satran et al. | |
| 5,244,318 A | 9/1993 | Arai et al. | |
| 5,246,315 A | 9/1993 | Hansson et al. | |
| 5,333,972 A | 8/1994 | Bernadic et al. | |
| 5,338,135 A | 8/1994 | Noguchi et al. | |
| 5,340,246 A | 8/1994 | Tukala | |
| 5,346,336 A | 9/1994 | Rescigno | |
| 5,377,116 A | 12/1994 | Wayne et al. | |
| 5,388,932 A | 2/1995 | DeRoche et al. | |
| 5,395,186 A | 3/1995 | Qvart | |
| 5,408,598 A | 4/1995 | Pryor, Jr. | |
| 5,421,679 A | 6/1995 | Pantzar et al. | |
| 5,443,335 A | 8/1995 | Shimano et al. | |
| 5,454,670 A | 10/1995 | Noda et al. | |
| 5,474,407 A | 12/1995 | Rodel et al. | |
| 5,536,119 A | 7/1996 | Werner et al. | |
| 5,586,843 A | 12/1996 | Minicozzi | |
| 5,593,255 A | 1/1997 | Satran et al. | |
| 5,634,745 A | 6/1997 | Wiman et al. | |
| 5,658,100 A | 8/1997 | Deiss et al. | |
| 5,688,081 A | 11/1997 | Paya | |
| 5,695,303 A | 12/1997 | Boianjiu et al. | |
| 5,725,334 A | 3/1998 | Paya | |
| 5,762,453 A | 6/1998 | Arai et al. | |
| 5,772,365 A | 6/1998 | Vogel et al. | |
| 5,779,401 A | 7/1998 | Stallwitz et al. | |
| 5,791,831 A | 8/1998 | Shimano et al. | |
| 5,791,833 A | 8/1998 | Niebauer | |
| 5,791,883 A | 8/1998 | Ban et al. | |
| 5,803,674 A | 9/1998 | Satran et al. | |
| 5,951,212 A | 9/1999 | Emoto et al. | |
| 5,951,213 A * | 9/1999 | Fauser et al. ............ 407/35 |
| 5,957,629 A | 9/1999 | Hessman et al. | |
| 5,957,635 A | 9/1999 | Nuzzi et al. | |
| 5,971,676 A | 10/1999 | Kojima | |
| 6,017,171 A | 1/2000 | Karlsson | |
| 6,050,752 A | 4/2000 | DeRoche | |
| 6,053,671 A | 4/2000 | Stedt et al. | |
| 6,100,904 A | 8/2000 | Gupta | |
| 6,142,716 A | 11/2000 | Jordberg et al. | |
| 6,152,658 A | 11/2000 | Satran et al. | |
| 6,164,878 A * | 12/2000 | Satran et al. ............ 407/113 |
| 6,186,705 B1 | 2/2001 | Kumar et al. | |
| 6,234,724 B1 * | 5/2001 | Satran et al. ............ 407/43 |
| 6,238,133 B1 | 5/2001 | DeRoche et al. | |
| 6,244,791 B1 | 6/2001 | Wiman et al. | |
| 6,257,807 B1 | 7/2001 | Heinloth | |
| 6,270,297 B1 | 8/2001 | Fang et al. | |
| 6,379,087 B1 | 4/2002 | Alexander, IV | |
| 6,540,448 B2 | 4/2003 | Johnson | |
| 6,543,970 B1 | 4/2003 | Qvarth et al. | |
| 6,599,061 B1 | 7/2003 | Nelson | |
| 6,601,484 B1 | 8/2003 | Katoh et al. | |
| 6,607,335 B2 | 8/2003 | Morgulis | |
| 6,623,217 B2 | 9/2003 | Brockett et al. | |
| 6,655,881 B2 | 12/2003 | Shimizu | |
| 6,669,412 B1 | 12/2003 | Hirose et al. | |
| 6,684,742 B1 | 2/2004 | White | |
| 6,715,967 B2 | 4/2004 | Wiman et al. | |
| 6,722,824 B2 | 4/2004 | Satran et al. | |
| 6,769,844 B2 | 8/2004 | Waggle | |
| 6,796,750 B2 * | 9/2004 | Men ............................ 407/35 |
| 6,811,359 B2 | 11/2004 | Craig | |
| 6,835,028 B2 | 12/2004 | Usui et al. | |
| 6,884,006 B2 | 4/2005 | Nagashima | |
| 6,921,233 B2 | 7/2005 | Duerr et al. | |
| 6,929,427 B2 | 8/2005 | Satran | |
| 6,929,429 B2 | 8/2005 | Riviére | |
| 6,948,889 B2 | 9/2005 | Arvidsson | |
| 6,957,935 B2 | 10/2005 | Sung et al. | |
| 6,960,049 B2 | 11/2005 | Inayama | |
| 7,021,871 B2 * | 4/2006 | Arvidsson et al. ............ 407/113 |
| 7,037,051 B2 | 5/2006 | Wermeister | |
| 7,070,363 B2 | 7/2006 | Long, II et al. | |
| 7,104,736 B2 | 9/2006 | Satran et al. | |
| 7,147,407 B2 | 12/2006 | Satran | |
| 7,201,545 B2 | 4/2007 | Ejderklint | |
| 7,220,083 B2 | 5/2007 | Festeau et al. | |
| 7,232,279 B2 | 6/2007 | Smilovici et al. | |
| 7,234,899 B2 | 6/2007 | Fang et al. | |
| 7,241,082 B2 | 7/2007 | Smilovici et al. | |
| 7,281,884 B2 | 10/2007 | Maeda | |
| 7,306,409 B2 * | 12/2007 | Stabel et al. ............ 407/113 |
| 7,325,471 B2 | 2/2008 | Massa et al. | |
| 7,367,755 B2 * | 5/2008 | Wurfels et al. ............ 407/113 |
| 7,393,163 B2 | 7/2008 | Edvardsson et al. | |
| 7,494,303 B2 | 2/2009 | Koskinen | |
| 7,537,419 B2 | 5/2009 | Sjoberg et al. | |
| 7,547,164 B2 | 6/2009 | Hessman | |
| 7,600,952 B2 | 10/2009 | Festeau et al. | |
| 7,604,440 B2 | 10/2009 | Fouquer | |
| 7,687,156 B2 | 3/2010 | Fang et al. | |
| 7,722,297 B2 | 5/2010 | Dufour et al. | |
| 7,806,634 B2 | 10/2010 | Festeau et al. | |
| 7,846,551 B2 | 12/2010 | Fang et al. | |
| 7,905,687 B2 | 3/2011 | Dufour et al. | |
| 7,905,689 B2 | 3/2011 | Dufour et al. | |
| 7,908,945 B2 | 3/2011 | Dufour et al. | |
| 7,976,250 B2 | 7/2011 | Fang et al. | |
| 7,988,387 B2 | 8/2011 | Festeau et al. | |
| 8,096,735 B2 | 1/2012 | Sladek et al. | |
| 8,147,171 B2 | 4/2012 | Dufour et al. | |
| 8,162,572 B2 | 4/2012 | Festeau et al. | |
| 8,277,151 B2 | 10/2012 | Wandeback | |
| 8,573,903 B2 * | 11/2013 | Morrison et al. ............ 407/113 |
| 8,657,539 B2 * | 2/2014 | Morrison et al. ............ 407/113 |
| 2003/0031520 A1 | 2/2003 | Hintze et al. | |
| 2003/0206777 A1 | 11/2003 | Gyllengahm | |
| 2003/0226694 A1 | 12/2003 | Moseley | |
| 2006/0115340 A1 | 6/2006 | Nishio et al. | |
| 2006/0210364 A1 | 9/2006 | Bellmann et al. | |
| 2007/0041798 A1 | 2/2007 | Nasu et al. | |
| 2007/0245535 A1 | 10/2007 | Noggle | |
| 2008/0304924 A1 | 12/2008 | Engstrom | |
| 2010/0080662 A1 | 4/2010 | Satran et al. | |
| 2010/0183386 A1 | 7/2010 | Heinloth et al. | |
| 2010/0272526 A1 | 10/2010 | Dufour et al. | |
| 2010/0303563 A1 | 12/2010 | Fang et al. | |
| 2010/0329800 A1 | 12/2010 | Edler et al. | |
| 2011/0103905 A1 | 5/2011 | Morrison et al. | |
| 2011/0110731 A1 | 5/2011 | Dufour et al. | |
| 2011/0150586 A1 | 6/2011 | Fang et al. | |
| 2012/0163929 A1 | 6/2012 | Dufour et al. | |
| 2012/0213605 A1 | 8/2012 | Festeau et al. | |
| 2012/0251250 A1 | 10/2012 | Morrison et al. | |

FOREIGN PATENT DOCUMENTS

| | | |
|---|---|---|
| CN | 1041499 C | 1/1999 |
| CN | 1041901 C | 2/1999 |
| CN | 1045557 C | 10/1999 |
| CN | 1117646 C | 8/2003 |
| CN | 1484563 A1 | 3/2004 |
| DE | 9400327 U1 | 3/1994 |
| DE | 4244316 A | 6/1994 |
| DE | 4118070 C2 | 2/1995 |
| DE | 4400538 A1 | 7/1995 |

(56) References Cited

FOREIGN PATENT DOCUMENTS

| | | |
|---|---|---|
| DE | 19847227 A1 | 4/2000 |
| DE | 102009049088 A1 | 4/2011 |
| EP | 0091408 A2 | 10/1983 |
| EP | 0035848 B1 | 2/1985 |
| EP | 0285660 A1 | 10/1988 |
| EP | 0432340 A1 | 6/1991 |
| EP | 0599393 A1 | 6/1994 |
| EP | 1013365 A | 6/2000 |
| EP | 1157768 A1 | 11/2001 |
| EP | 1205877 A1 | 5/2002 |
| EP | 1346789 B1 | 11/2006 |
| EP | 1749602 A2 | 2/2007 |
| EP | 1952925 A2 | 8/2008 |
| EP | 2119520 A1 | 11/2009 |
| EP | 2620243 A1 | 7/2013 |
| FR | 2364724 A1 | 4/1978 |
| GB | 951624 | 3/1964 |
| GB | 2298600 A | 9/1996 |
| IL | 169340 | 4/2010 |
| JP | 49-32280 A | 3/1974 |
| JP | 52-103081 A | 8/1977 |
| JP | 59-214501 A | 12/1984 |
| JP | 60-22218 U | 2/1985 |
| JP | 61-201719 U | 12/1986 |
| JP | 4-315510 A | 11/1992 |
| JP | 5-285708 A | 11/1993 |
| JP | 7-33525 U | 6/1995 |
| JP | 8-039329 | 2/1996 |
| JP | 8-174327 A | 7/1996 |
| JP | 8-243831 A | 9/1996 |
| JP | H08-243827 A | 9/1996 |
| JP | 11-129109 A | 5/1999 |
| JP | 2002-301603 | 10/2002 |
| JP | 2003-25135 A | 1/2003 |
| JP | 2003-275920 | 9/2003 |
| JP | 2004-230472 A | 8/2004 |
| JP | 2004-291099 | 10/2004 |
| KR | 10-0430868 | 6/2004 |
| KR | 100783795 B1 | 12/2007 |
| RU | 2022727 C1 | 11/1994 |
| RU | 2138371 C1 | 9/1999 |
| RU | 2005110805 A | 10/2006 |
| RU | 2318634 C2 | 3/2008 |
| SU | 344930 A | 8/1972 |
| SU | 804239 A1 | 2/1981 |
| SU | 814573 A1 | 3/1981 |
| SU | 1215879 A | 3/1986 |
| SU | 1278110 A1 | 12/1986 |
| SU | 1504006 A1 | 8/1989 |
| WO | WO 92/21467 A1 | 12/1992 |
| WO | WO 94/12302 A1 | 6/1994 |
| WO | WO 95/00272 A1 | 1/1995 |
| WO | WO 95/32071 A1 | 11/1995 |
| WO | WO 96/35538 A1 | 11/1996 |
| WO | WO 00/23218 A1 | 4/2000 |
| WO | WO 01/28722 A1 | 4/2001 |
| WO | WO 02/18083 A2 | 3/2002 |
| WO | WO 02/20206 A1 | 3/2002 |
| WO | WO 02/102536 A1 | 12/2002 |
| WO | WO 03/099495 A1 | 12/2003 |
| WO | WO 2004/096474 A1 | 11/2004 |
| WO | WO 2006/041353 A1 | 4/2006 |
| WO | WO 2008/029964 A1 | 3/2008 |
| WO | WO 2010/017859 A1 | 2/2010 |
| WO | WO 2010/134700 A2 | 11/2010 |

OTHER PUBLICATIONS

Bourke, Paul, "Spline Curves (in 3D)", Nov. 1996, XP002300113, printed from http://astronomy.swin.edu.au/~pbourke/curves/spline/, 5 pages.
Shi dongping, et al., CAD/CAM for Cemented Carbide Indexable Inserts, J. Huazhong Univ. of Sci. & Tech., vol. 22, No. 2, Feb. 1994, with English abstract, 4 pages.
Shaw et al., "The Rotary Cutting Tool," Transactions of the ASME, Aug. 1952, Cambridge, Massachusetts, pp. 1065-1076.
Armarego et al., "Fundamental Studies of Driven and Self-Propelled Rotary Tool Cutting Processes—I. Theoretical Investigation," Int. J. Mach. Tools Manufact., 1994, vol. 34, No. 6, pp. 785-801.
Davis et al., Metals Handbook Ninth Edition, vol. 16, Machining, 1989, p. 311.
Milling Cutters and End Mills, The American Society of Mechanical Engineers, An American National Standard, ASME B94.19-1997, Revision of ANSI/ASME B94.19-1985, pp. 2-4.
Fundamentals of Tool Design, Fourth Edition, revised by Dr. John G. Nee, CMfgE, Society of Manufacturing Engineers, 1998, p. 103.
Oberg et al., 26th Edition Machinery's Handbook, A Reference Book for the Mechanical Engineer, Designer, Manufacturing Engineer, Draftsman, Toolmaker, and Machinist, Industrial Press Inc., New York, 2000, pp. 723-724.
"Reference Book for a Tool Man", Editor I.A. Ordinartsev, Leningrad "Machinostroenie" Publishing House Leningrad Branch, 1987, p. 342. (English translation).
U.S. Appl. No. 13/721,335, filed Dec. 20, 2012, (34 pages).
U.S. Appl. No. 13/773,743, filed Feb. 22, 2013, (82 pages).
U.S. Appl. No. 13/626,185, filed Sep. 25, 2012, (53 pages).

* cited by examiner

SEC. G-G

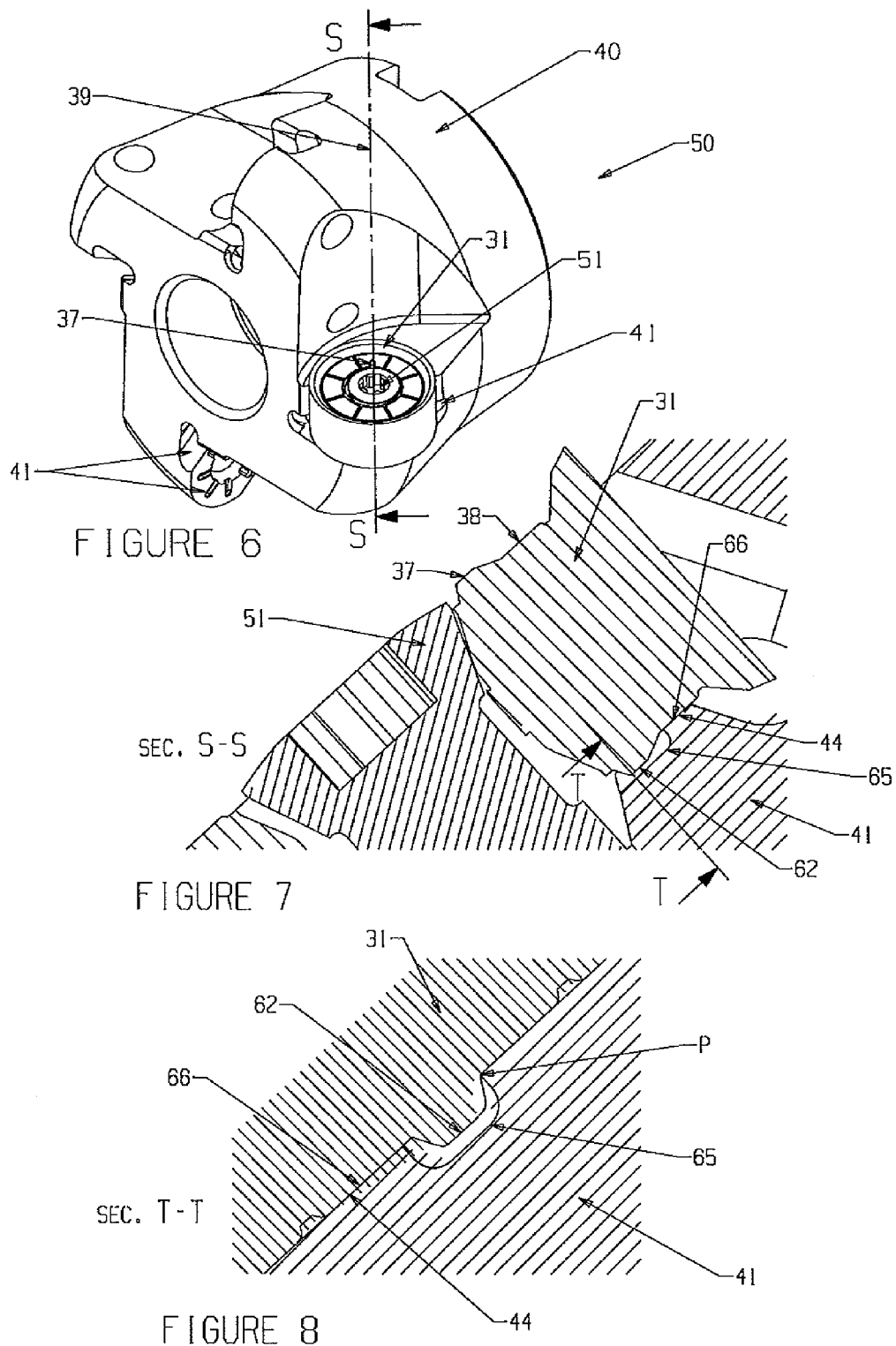

SEC. H-H

SEC. B-B

DOUBLE-SIDED CUTTING INSERTS WITH ANTI-ROTATION FEATURES

BACKGROUND OF THE TECHNOLOGY

1. Field of Technology

The present disclosure generally relates to cutting inserts and cutting tools including the cutting inserts. The present disclosure more particularly relates to double-sided cutting inserts comprising features to prevent rotation of the cutting inserts when mounted to a cutting tool.

2. Description of the Background of the Technology

Cutting inserts used in machining of metals and metal alloys may be mounted in an insert receiving pocket of a tool holder for a cutting tool. The cutting insert may be secured in the insert receiving pocket by, for example, a fastening screw inserted through a hole in the cutting insert in an orientation to present a cutting edge of the cutting insert to a workpiece. The cutting insert may be indexable such that the cutting insert is configured to be rotated or otherwise repositioned in the insert receiving pocket by the operator to expose a new cutting edge when a cutting edge in use becomes worn and/or damaged. The cutting insert may be subjected to compressive forces, vibratory forces, and/or rotational torque during machining operations. Due to the compression, vibration, rotation, and/or improper indexing of the cutting insert, the cutting insert may rotate within the insert receiving pocket. The rotation of the cutting insert may result in chipping and/or cracking of the cutting insert, undesired contact between the cutting insert and the cutting tool, loosening of the fastening screw, ejection of the cutting insert from the insert receiving pocket, poor finishing, dimensional inaccuracies, and/or excessive tool wear.

Therefore, it would be advantageous to provide cutting inserts and cutting tools including features of the cutting insert that prevent rotation of the cutting insert within the insert receiving pocket of a tool holder of a cutting tool during machining of a workpiece.

SUMMARY

One non-limiting aspect according to the present disclosure is directed to a double-sided cutting insert generally comprising a top surface, a bottom surface, at least one side surface interconnecting the top surface and the bottom surface and forming at least one cutting edge. A through hole may extend between the top surface and bottom surface. Each of the top surface and bottom surface may comprise at least one anti-rotation element preventing rotation of the cutting insert when secured in the insert receiving pocket of a tool holder for a cutting tool.

Another non-limiting aspect according to the present disclosure is generally directed to a cutting tool comprising a tool holder including an insert receiving pocket comprising at least one recess; and a double-sided cutting insert comprising: a top surface, a bottom surface, at least one side surface interconnecting the top surface and the bottom surface and forming at least one cutting edge, and a through hole extending between the top surface and bottom surface. Each of the top surface and bottom surface may comprise at least one anti-rotation element to at least partially extend into the insert receiving pocket to prevent rotation of the cutting insert in the insert receiving pocket.

Yet another non-limiting aspect according to the present disclosure is generally directed to an anti-rotation arrangement between a double-sided cutting insert and an insert receiving pocket comprising at least one recess in a tool holder. The cutting insert may comprise a top surface, a bottom surface, at least one side surface interconnecting the top surface and the bottom surface and forming at least one cutting edge, and a through hole extending between the top surface and bottom surface, wherein each of the top surface and bottom surface comprises at least one anti-rotation element that is received by and cooperates with the anti-rotation element to prevent rotation of the cutting insert in the insert receiving pocket.

Another non-limiting aspect according to the present disclosure is generally directed to a method of machining a metal or metal alloy. The method may comprise providing a cutting tool comprising a tool holder including an insert receiving pocket including at least one recess, and a double-sided cutting insert. The double-sided cutting insert may comprise a top surface, a bottom surface, at least one side surface interconnecting the top surface and the bottom surface and forming at least one cutting edge, and a through hole extending between the top surface and bottom surface, wherein each of the top surface and bottom surface comprises at least one anti-rotation element, at least one seat face, and chip breaker geometry, wherein the anti-rotation element at least partially extends into the insert receiving pocket and prevents rotation of the cutting insert in the insert receiving pocket. The at least one anti-rotation element may prevent rotation of the cutting insert when secured in the insert receiving pocket of a tool holder for a cutting tool. The at least one cutting edge may contact a workpiece to generate a chip, and the chip may contact the at least one seat face and may not contact the at least one anti-rotation element.

It is understood that the invention disclosed and described in the present disclosure is not limited to the embodiments described in this Summary or the Abstract.

BRIEF DESCRIPTION OF THE DRAWINGS

The various non-limiting embodiments described herein may be better understood by considering the following description in conjunction with one or more of the accompanying drawings.

FIGS. 5 and 6 are perspective views illustrating non-limiting embodiments of a cutting tool according to the present disclosure.

FIG. 7 is a sectioned view of the cutting tool illustrated in FIG. 6.

FIG. 8 is a sectioned view of the cutting tool illustrated in FIG. 7.

Figure 1:
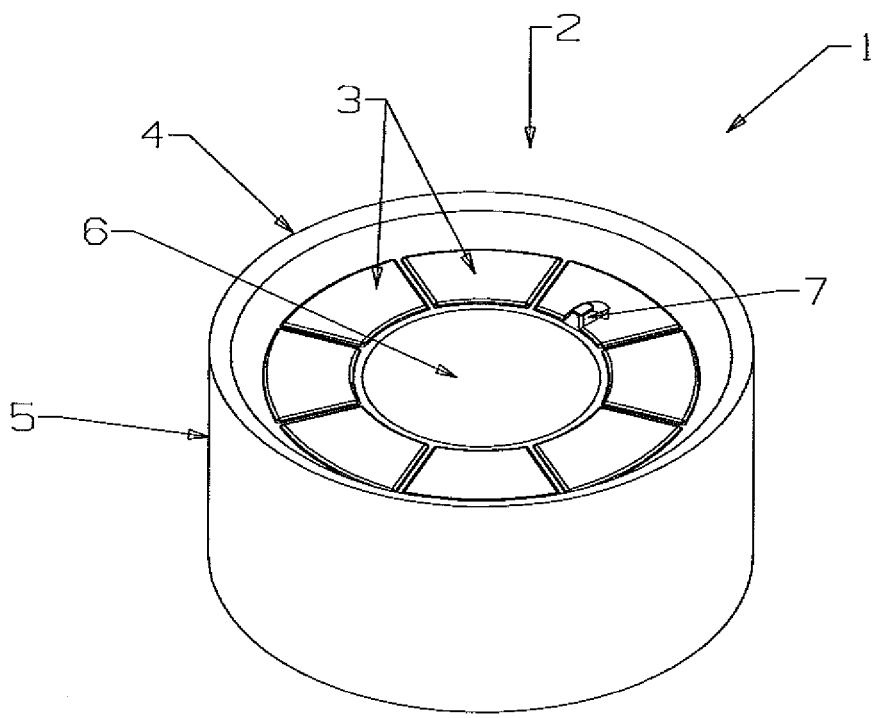
FIGS. 1 and 2 are perspective views illustrating a non-limiting embodiment of a double-sided cutting insert according to the present disclosure.

The reader will appreciate the foregoing details, as well as others, upon considering the following description of various non-limiting embodiments according to the present disclosure.

DESCRIPTION OF CERTAIN NON-LIMITING EMBODIMENTS

The present disclosure describes features, aspects, and advantages of various non-limiting embodiments of cutting inserts and cutting tools. It is understood, however, that this disclosure also embraces numerous alternative embodiments that may be accomplished by combining any of the various features, aspects, and/or advantages of the various non-limiting embodiments described herein in any combination or sub-combination that one of ordinary skill in the art may find useful. Such combinations or sub-combinations are intended to be included within the scope of this specification. As such, the claims may be amended to recite any features or aspects expressly or inherently described in, or otherwise expressly or inherently supported by, the present disclosure. Further, Applicants reserve the right to amend the claims to affirmatively disclaim any features or aspects that may be present in the prior art. Therefore, any such amendments comply with the requirements of 35 U.S.C. §112, first paragraph, and 35 U.S.C. §132(a). The various non-limiting embodiments disclosed and described in this disclosure may comprise, consist of, or consist essentially of the features and aspects as variously described herein.

All numerical quantities stated herein are approximate, unless stated otherwise. Accordingly, the term "about" may be inferred when not expressly stated. The numerical quantities disclosed herein are to be understood as not being strictly limited to the exact numerical values recited. Instead, unless stated otherwise, each numerical value included in the present disclosure is intended to mean both the recited value and a functionally equivalent range surrounding that value. Notwithstanding the approximations of numerical quantities stated herein, the numerical quantities described in specific examples of actual measured values are reported as precisely as possible.

Any numerical range recited in this disclosure is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this disclosure is intended to include all lower numerical limitations subsumed therein and any minimum numerical limitation recited in this specification is intended to include all higher numerical limitations subsumed therein. Accordingly, applicants reserve the right to amend this disclosure, including the claims, to expressly recite any sub-range subsumed within the ranges expressly recited herein. All such ranges are intended to be inherently described in this disclosure such that amending to expressly recite any such sub-ranges would comply with the requirements of 35 U.S.C. §112, first paragraph, and 35 U.S.C. §132(a).

In the present disclosure, certain details are set forth in order to provide a better understanding of various non-limiting embodiments. However, one skilled in the art will understand that these embodiments may be practiced without these details and/or in the absence of any details not described herein. In other instances, well-known structures, methods, and/or techniques associated with methods of practicing the various non-limiting embodiments may not be shown or described in detail to avoid unnecessarily obscuring descriptions of other details of the various non-limiting embodiments.

As generally used herein, the articles "the", "a", and "an" refer to one or more of what is claimed or described.

As generally used herein, the terms "include", "includes", and "including" are meant to be non-limiting.

As generally used herein, the terms "have", "has", and "having" are meant to be non-limiting.

As generally used herein, the term "machining" and "machining" refer to turning, milling, drilling, boring, planing, shaping, reaming, and the like performed on metallic materials, including metals and metal alloys.

In various non-limiting embodiments, a cutting tool and/or cutting insert may comprise any material suitable for the cutting operations for which the cutting insert is intended. In various non-limiting embodiments, the cutting tool and/or cutting insert may generally comprise one or more of high speed steel, cobalt alloys, cemented carbides (e.g., tungsten carbide-cobalt materials), cermets (e.g., cermets that have nickel-cobalt binder and a high level of titanium and could further include tungsten carbide and titanium carbide), ceramics (e.g., silicon nitride-based ceramics, SiAlON-based ceramics, titanium carbonitride-based ceramics, titanium diboride-based ceramics, and alumina-based ceramics), diamond, and polycrystalline diamond. In various non-limiting embodiments, the cemented carbides may comprise at least one ceramic component and a metallic binder. The ceramic component may comprise carbides of any carbide-forming element, such as, for example, titanium, chromium, vanadium, zirconium, hafnium, molybdenum, tantalum, tungsten, and niobium. The binder may comprise a metal or metallic alloy, such as, for example, cobalt, nickel, iron, or alloys thereof.

In various non-limiting embodiments, a cutting insert may be manufactured using powder metallurgy techniques, such as, for example, blending, pressing, and sintering of powdered metals. A cemented carbide cutting insert (e.g., comprising tungsten carbide hard particles and cobalt-based binders) may be manufactured by blending metal carbide powder and metal binder powder, pressing the blended metallurgical powders in a mold to form a powder compact in the shape of the cutting insert, and sintering the powder compact to densify the composite material into a cemented carbide cutting insert. The pressing of the blended metallurgical powders into a powder compact may be a near-net-shape operation in which the geometry of the mold cavity and pressing punches match and/or closely match the final geometry of the cutting insert being produced. Consequently, the powder compaction and pressing punches comprise accurate and precise geometries and structural features because any structural or geometric deviations or non-uniformities may be transferred from the press tooling to the pressed powder compact and ultimately to the sintered cutting insert.

In various non-limiting embodiments, a cutting insert may comprise a one or more coating layers, such as, for example, titanium nitride, titanium carbide, aluminum oxide, silicon nitride, and zirconium oxide. In various non-limiting embodiments, methods for coating a cutting insert may comprise chemical vapor deposition, physical vapor deposition, and diamond coating.

Figure 2:
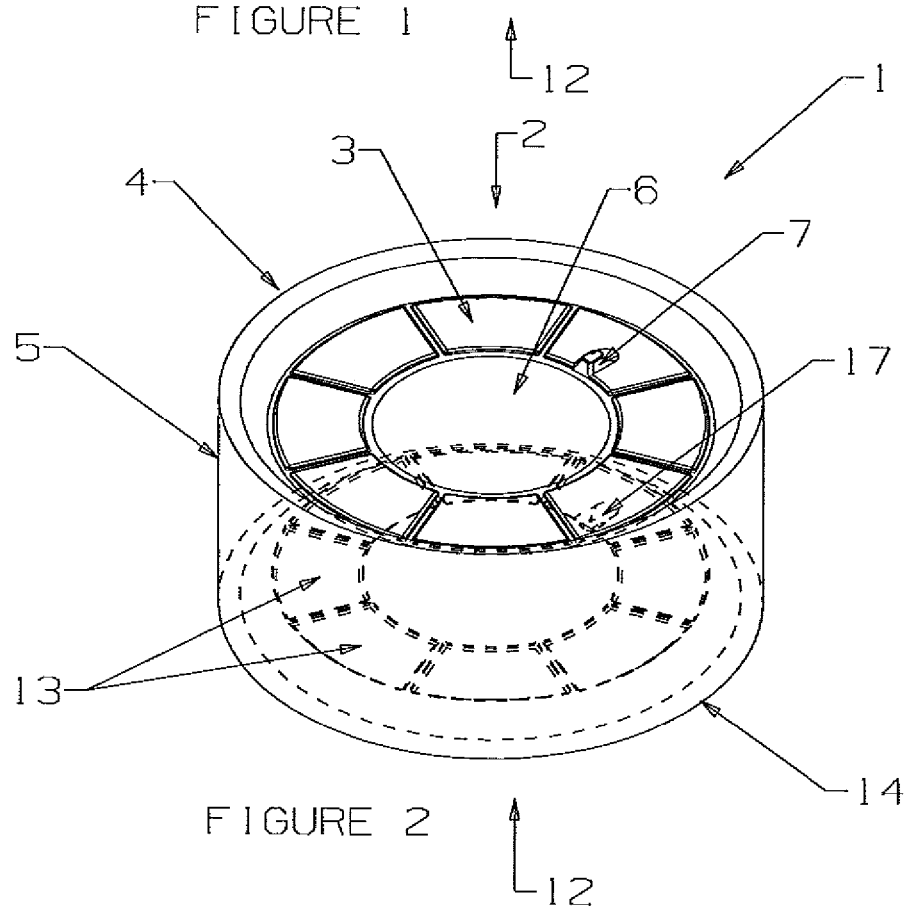

Referring to FIGS. 1 and 2, in various non-limiting embodiments, a double-sided cutting insert 1 may generally comprise a top surface 2, a bottom surface 12, at least one side surface 5 interconnecting the top surface 2 and the bottom surface 12, a cutting edge 4 at the intersection of the top surface 2 and the side surface 5, and a cutting edge 14 at the intersection of the bottom surface 12 and the side surface 5. A through hole 6 may extend between the top surface 2 and bottom surface 12. At least one anti-rotation feature or element 7 may be provided on the top surface 2, and at least one anti-rotation feature or element 17 may be provided on the bottom surface 12. In various non-limiting embodiments, the cutting insert 1 may comprise up to twenty anti-rotation elements 7 disposed on the top surface 2 and up to twenty anti-rotation elements 17 disposed on the bottom surface 12. In various non-limiting embodiments, the cutting insert 1 may comprise 1-20 anti-rotation elements 7 disposed on each of the top surface 2 and bottom surface 12, such as, for example, 1-16 anti-rotation elements, 4-12 anti-rotation elements, one anti-rotation element, five anti-rotation elements, six anti-rotation elements, or eight anti-rotation elements. As shown in FIGS. 1 and 2, in various non-limiting embodiments, the cutting insert 1 may comprise a single anti-rotation element 7 disposed on the top surface 2, and a single anti-rotation element 17 disposed on the bottom surface 12.

In various non-limiting embodiments, the cutting insert 1 may comprise at least one seat face 3 on the top surface 2 and/or at least one seat face 13 on the bottom surface 12. The at least one seat face may be configured to engage a tool holder. The cutting insert 1 may comprise up to twenty seat faces on each of the top surface 2 and bottom surface 12. In various non-limiting embodiments, the top surface 2 and/or bottom surface may each individually comprise 1-20 seat faces, 2-12 seat faces, 2-8 seat faces, one seat face, two seat faces, three seat faces, four seat faces, five faces, six seat faces, seven seat faces, eight seat faces, nine seat faces, ten seat faces, eleven seat faces, or twelve seat faces. In various non-limiting embodiments, the at least one seat face 3 may comprise a plurality of seat faces evenly circumferentially spaced apart on the top surface 2 and/or bottom surface 12. In at least one embodiment, the top surface 2 may comprise one seat face 3 and/or the bottom surface 12 may comprise one seat face 13. In at least one embodiment, the top surface 2 may comprise five seat faces 3 and/or the bottom surface 12 may comprise five seat faces 13. As shown in FIGS. 1 and 2, in various non-limiting embodiments, the top surface 2 may comprise eight seat faces 3, and the bottom surface 12 may comprise eight seat faces 13.

In various non-limiting embodiments, the cutting insert 1 may comprise at least one seat face on each of the top surface and bottom surface comprising an anti-rotation element. In various non-limiting embodiments, the cutting insert may comprise a plurality of seat faces on the top surface and a plurality of seat faces on the bottom surface, wherein at least one of the plurality of seat faces on the top surface comprises an anti-rotation element, and wherein at least one of the plurality of seat faces on the bottom surface comprise an anti-rotation element. In various non-limiting embodiments, each of the plurality of seat faces on the top surface and/or plurality of seat faces on the bottom surface may comprise an anti-rotation element. In various non-limiting embodiments, one of the plurality of seat faces on the top surface and/or one of the plurality of seat faces on the bottom surface may comprise an anti-rotation element. In at least one embodiment, the top surface 2 may comprise one seat face 3 comprising the anti-rotation element 7 and/or the bottom surface 12 may comprise one seat face 13 comprising the anti-rotation element 17. In at least one embodiment, the top surface 2 may comprise five seat faces 3, wherein one of the five seat faces comprises an anti-rotation element 7, and/or the bottom surface 12 may comprise five seat faces 13, wherein one of the five seat faces 13 comprises an anti-rotation element 17. As shown in FIGS. 1 and 2, in various non-limiting embodiments, the top surface 2 may comprise eight seat faces 3, wherein one of the eight seat faces 3 comprises an anti-rotation element 7, and the bottom surface 12 may comprise eight seat faces 13, wherein one of the eight seat faces 13 comprises an anti-rotation element 17.

In various non-limiting embodiments, an area of the anti-rotation element may be substantially less than an area of the at least one seat face. The area of the anti-rotation element may comprise the surface area at the interface of the anti-rotation element and seat face. In various non-limiting embodiments, the area of the at least one seat face may be greater than the area of the anti-rotation element. In various non-limiting embodiments, the area of the at least one seat face may be 5-95%, 10-90%, 20-80%, 25-75%, 30-50%, at least 25%, at least 50%, and at least 75%, greater than the area of the anti-rotation element.

Figure 3:
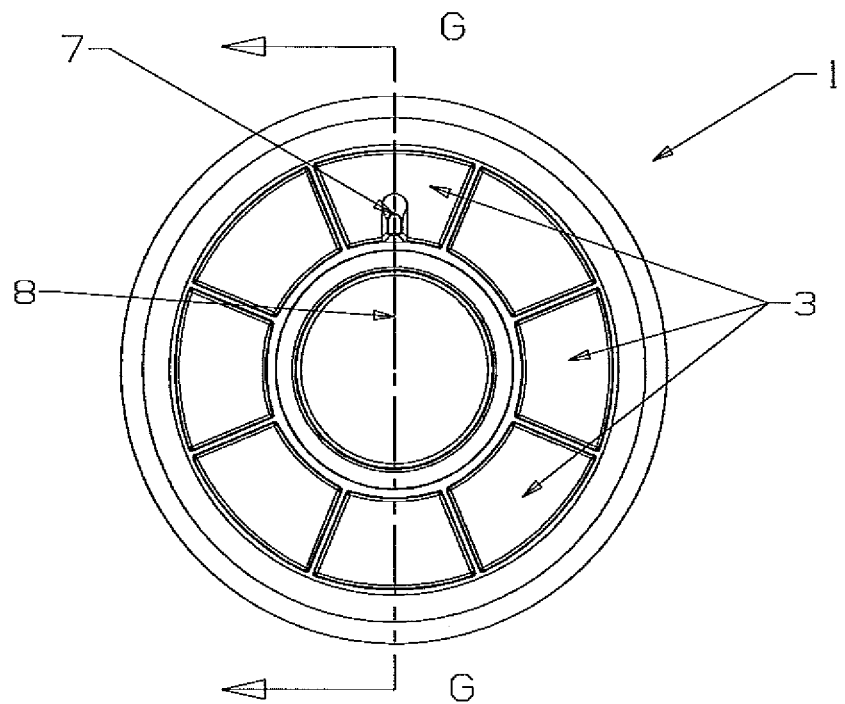
FIG. 3 is a top view of a non-limiting embodiment of a double-sided cutting insert according to the present disclosure.
Figure 4:
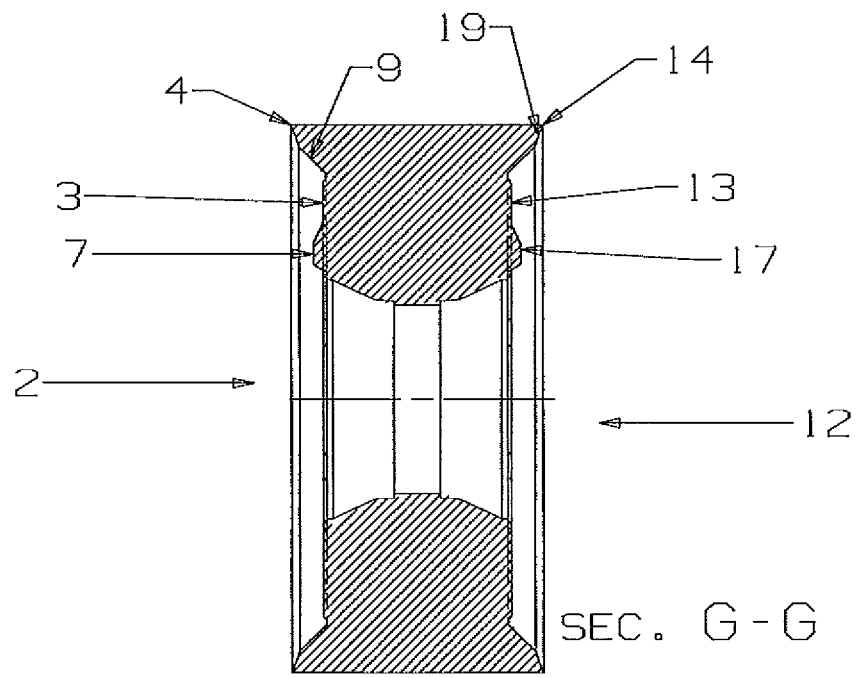
FIG. 4 is a sectioned view of the cutting insert illustrated in FIG. 3.

In various non-limiting embodiments, the anti-rotation element may be oriented toward a longitudinal axis of the cutting insert that is perpendicular to the top surface and/or bottom surface. In various non-limiting embodiments, the anti-rotation element may be perpendicular to the longitudinal axis of the cutting insert. In various non-limiting embodiments, the anti-rotation element may be aligned with a median plane along the longitudinal axis that divides the cutting insert into two equal portions. As shown in FIGS. 3 and 4, in various non-limiting embodiments, the anti-rotation element 7, 17 may extend along a center line 8 that divides the seat face 3, 13 into two equal portions. In various non-limiting embodiments, a center line 8 of the anti-rotation element 7, 17 may coincide with the center line 8 of the seat face 3, 13. In various non-limiting embodiments, the anti-rotation element 7, 17 may be offset from the center line 8 of the seat face 3, 13.

In various non-limiting embodiments, the anti-rotation element may be proximate to the through hole, adjacent to the through hole, and/or adjoining the through hole that extends through the cutting insert between the top surface and the bottom surface. As shown in FIGS. 1-4, in various non-limiting embodiments, the anti-rotation element 7, 17 may adjoin a periphery of the through hole 6. In various non-limiting embodiments, a distance from the anti-rotation element to a periphery of the through hole may be zero. In various non-limiting embodiments, the anti-rotation element may contact the cutting edge. In various non-limiting embodiments, the anti-rotation element may be spaced apart from the cutting edge. In various non-limiting embodiments, the anti-rotation element may be disposed on the seat face intermediate the cutting edge and the through hole.

In various non-limiting embodiments, the top surface and bottom surface may each comprise an inner edge comprising the periphery of through hole opposed to an outer edge comprising the cutting edge. In various non-limiting embodiments, the anti-rotation element may be proximate the inner edge, adjacent the inner edge, and/or adjoining the inner edge. As shown in FIGS. 1-4, in various non-limiting embodiments, the anti-rotation element 7, 17 may adjoin the inner edge. In various non-limiting embodiments, the anti-rotation element may be proximate to the inner edge. In various non-limiting embodiments, the anti-rotation element may contact the inner edge. In various non-limiting embodiments, the anti-rotation element may be integral to the inner edge. In various non-limiting embodiments, the anti-rotation element may be spaced apart from the outer edge. In various non-limiting embodiments, the anti-rotation element may be disposed on a seat face intermediate the outer edge and the inner edge.

In various non-limiting embodiments, the cutting insert may comprise an angle ($\alpha$) formed between a plane perpendicular to the top surface and intersecting the anti-rotation element on the top surface and a plane perpendicular to the bottom surface and intersecting the anti-rotation element on the bottom surface. In various non-limiting embodiments, the angle may be 0° to 360°, greater than 0° to 360°, 0° to 180°, or 0° to 90°, such as, for example, 0°, greater than 0°, and 180°. As shown in FIGS. 2 and 4, in various non-limiting embodiments, the angle may be 0°.

In various non-limiting embodiments, the top surface may be substantially identical and/or identical to the bottom surface. In various non-limiting embodiments, the top surface, including the geometry and the position of each anti-rotation element thereon, may be identical to the bottom surface. In various non-limiting embodiments, the anti-rotation element on the top surface may be opposed to the anti-rotation element on the bottom surface. As shown in FIGS. 2 and 4, in various non-limiting embodiments, the anti-rotation element 7 may be opposed to the anti-rotation element 17, and the top surface 2 may be identical to the bottom surface 12. In various non-limiting embodiments, the cutting insert may comprise a top surface comprising a seat face and a bottom surface comprising a seat face, wherein each seat face comprises an anti-rotation element and the angle $\alpha$ may be 0°. In various non-limiting embodiments, the top surface may be identical to the bottom surface and the angle $\alpha$ may be 0°. In various non-limiting embodiments, the top surface may be substantially identical to the bottom surface except that the angle $\alpha$ is not 0°. In various non-limiting embodiments, the top surface may be substantially identical to the bottom surface except that the position of each anti-rotation element is different. In various non-limiting embodiments, the top surface may be substantially identical to the bottom surface except that the geometry of each anti-rotation element is different. In various non-limiting embodiments, the top surface may not be identical to the bottom surface.

In various non-limiting embodiments, the cutting insert may comprise an anti-rotation element protruding from the top surface and an anti-rotation element protruding from the bottom surface. In various non-limiting embodiments, the anti-rotation element may comprise a projection. Referring to FIG. 4, in various non-limiting embodiments, a cutting insert may comprise a top surface 2 including a cutting edge 4, a seat face 3, chip breaker geometry 9, and an anti-rotation element 7, and a bottom surface 12 including a cutting edge 14, a seat face 13, chip breaker geometry 19, and an anti-rotation element 17. As shown in FIG. 4, the anti-rotation element 7 may protrude from the top surface 2, and the anti-rotation element 17 may protrude from the bottom surface 12. In various non-limiting embodiments, the anti-rotation element may be integral with the top surface and/or bottom surface, respectively. As shown in FIG. 4, the anti-rotation element 7 may be integral with the top surface 2, and the anti-rotation element 17 may be integral with the bottom surface 12.

In various non-limiting embodiments, the geometry of the anti-rotation element may comprise any a suitable cross-sectional shape and/or contour to allow at least a portion of the anti-rotation element to be mounted in the insert receiving pocket of the cutting tool. The anti-rotation element may comprise a cross-sectional shape selected from, for example, a circle, an ellipse, an oval, a polygon, a parallelogram, a rectangle, a square, a trapezoid, and a triangle. As shown in FIG. 4, for example, the geometry of the anti-rotation element 7, 17 may comprise a generally trapezoidal cross-section.

In various non-limiting embodiments, the anti-rotation element may comprise a planar surface and at least one angled surface. In various non-limiting embodiments, the at least one angled surface may comprise a chamfer. In various non-limiting embodiments, the anti-rotation element may comprise 1-16 angled surfaces, such as, for example one angled surface, two angled surfaces, and four angled surfaces. In various non-limiting embodiments, the planar surface may be substantially parallel and/or parallel to the top surface and/or bottom surface.

In various non-limiting embodiments, the at least one angled surface may slope upwardly from the top surface and/or bottom surface to the planar surface. As shown in FIGS. 1-4, the anti-rotation element 7, 17 may comprise a top planar surface and four angled surfaces sloping upwardly from the top surface 2 and bottom surface 12 to the planar surface, respectively. In various non-limiting embodiments, the at least one angled surface may comprise an angle greater than 0° to 90°, 1° to 60°, and 5° to 45° formed between the angled surface of the anti-rotation element and the top surface and/or bottom surface of the cutting insert. In various non-limiting embodiments, the angle of each of the at least one angled surfaces may be the same or different. In various non-limiting embodiments, the anti-rotation element may comprise four angled surfaces, wherein the angle of a first angled surface is different from the other angled surfaces. In various non-limiting embodiments, the anti-rotation element may comprise four angled surfaces, wherein the angle of a first angled surface is different from the other angled surfaces each comprising the same angle. In various non-limiting embodiments, the anti-rotation element may comprise four angled surfaces, wherein a first angled surface may comprise an angle less than 45°, such as, for example, 30°, and the other angled surfaces may independently comprise an angle greater than 45°, such as, for example, 60°.

In various non-limiting embodiments, the cutting insert may comprise a plurality of anti-rotation elements on each of the top surface and the bottom surface. The plurality of anti-rotation elements may be evenly circumferentially spaced about the top surface and the bottom surface. In various non-limiting embodiments, the cutting insert may comprise a plurality of seat faces on each of the top surface and bottom surface, and each of the anti-rotation elements may be disposed on a seat face. In various non-limiting embodiments, the cutting insert may comprise a plurality of seat faces on each of the top surface and bottom surface, wherein each of a plurality of seat faces on the top surface comprises an anti-rotation element, and each of a plurality of seat faces on the bottom surface comprises an anti-rotation element. In various non-limiting embodiments, the top surface may comprise five seat faces, each seat face comprising an anti-rotation element, and/or the bottom surface may comprise five seat faces, each seat face comprising an anti-rotation element. In various non-limiting embodiments, the top surface may comprise six seat faces, each comprising an anti-rotation element, and the bottom surface may comprise six seat faces, each comprising an anti-rotation element. In various non-limiting embodiments, the top surface may comprise eight seat faces, each comprising an anti-rotation element, and the bottom surface may comprise eight seat faces, each comprising an anti-rotation element.

In various non-limiting embodiments, the cutting insert may comprise chip breaker geometry on each of the top surface and bottom surface. As known in the art, chip breaker geometry may be provided to reduce cutting forces and/or advantageously influence the size and shape of chips produced during machining. In various non-limiting embodiments, the chip breaker geometry may be proximate to the cutting edge, adjacent the cutting edge, and/or adjoining the cutting edge. In various non-limiting embodiments, the chip breaker geometry may be spaced apart from the anti-rotation element. In various non-limiting embodiments, the chip breaker geometry may not comprise the anti-rotation element. In various non-limiting embodiments, the seat face may be intermediate the chip breaker geometry and the anti-rotation element. As shown in FIG. 4, a region of the seat face 3, 13 may be intermediate the chip breaker geometry 9, 19 and the anti-rotation element 7, 17 such that the anti-rotation element 7, 17 is spaced apart from the chip breaker geometry 9, 19. In various non-limiting embodiments, the chip breaker geometry may be configured to generate substantially identical and/or identical chip formation for each at least one cutting edge.

In various non-limiting embodiments, the cutting insert may comprise an indexable cutting insert. The cutting insert may be indexable to position between different regions of the cutting edge on the top surface and between different regions of the cutting edge on the bottom surface. For example, when the original cutting edge becomes worn and/or damaged, the fastening screw may be loosened by the operator and the cutting insert may be removed from the tool holder such that the anti-rotation element is removed from the recess of the insert receiving pocket. The operator may rotate the cutting insert to position a new region of the cutting edge to engage a workpiece. The cutting insert may be secured to the tool holder such that the anti-rotation element at least partially extends into a different recess of the insert receiving pocket of the tool holder. The fastening screw may be tightened to secure the cutting insert to the tool holder of a cutting tool. The operator may identify the various indexable cutting edge regions of the cutting insert by providing a single anti-rotation element or a plurality of anti-rotation elements on the cutting insert and a plurality of recesses in the insert receiving pocket of the tool holder. The cutting insert described herein may allow the operator to accurately position the anti-rotation element within the recess, and thus, accurately index the cutting insert and present a desired region of the cutting edge to a workpiece.

In various non-limiting embodiments, the cutting insert may comprise a double-sided cutting insert selected from one of a round-shaped cutting insert, a square-shaped cutting insert, a pentagon-shaped cutting insert, a hexagon-shaped cutting insert, a heptagon-shaped cutting insert, an octagon-shaped cutting insert, a decagon-shaped cutting insert, and a dodecagon-shaped cutting insert. The shape of the double-sided cutting insert may comprise a portion of a cutting edge and/or a periphery portion including a convex shape and/or an arc shape. In various non-limiting embodiments, the shape of the cutting insert may comprise a polygonal shape and/or a convex shape. In various non-limiting embodiments, the cutting insert may comprise a double-sided round cutting insert. In various non-limiting embodiments, the cutting insert may comprise a double-sided octagonal cutting insert. In various non-limiting embodiments, the cutting insert may generally comprise any size and shape suitable for metal machining, such as, for example, turning, milling, drilling, boring, planing, shaping, and reaming.

In various non-limiting embodiments, a cutting tool may generally comprise a tool holder including an insert receiving pocket comprising at least one recess; and a double-sided cutting insert comprising a top surface, a bottom surface, at least one side surface interconnecting the top surface and the bottom surface and forming at least one cutting edge. A through hole may extend between the top surface and the bottom surface. Each of the top surface and the bottom surface may comprise an anti-rotation element, wherein the anti-rotation element at least partially extends into at least one recess of the insert pocket when the cutting insert is mounted in the pocket to prevent rotation of the cutting insert in the insert receiving pocket. The anti-rotation element may utilize point contact within the recess between the anti-rotation element and the recess to prevent rotation of the cutting insert in either angular direction parallel to the top surface and/or bottom surface of the cutting insert.

Figure 5:
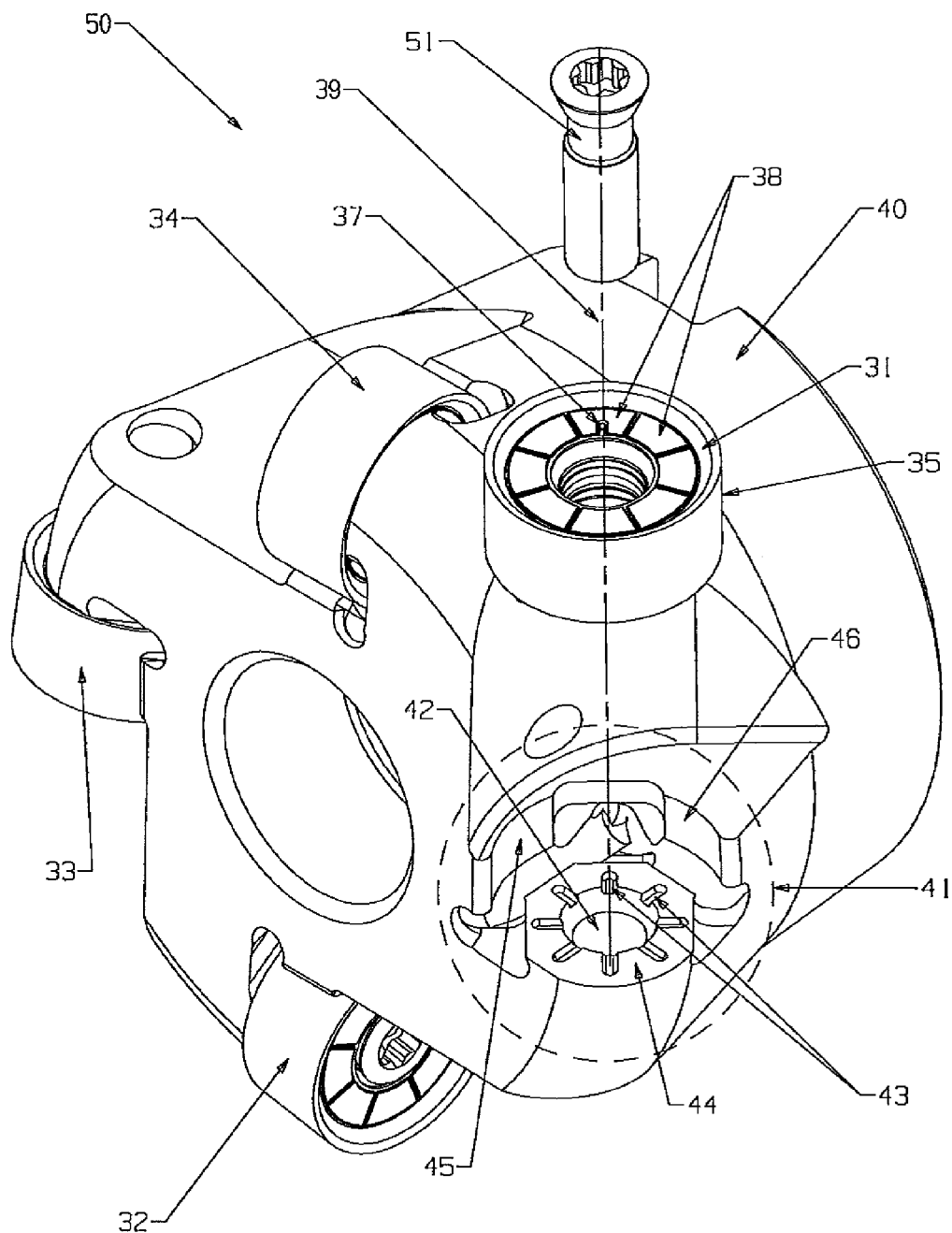

In various non-limiting embodiments, a cutting tool for machining of metals or metal alloys may generally comprise a tool holder, an insert comprising an anti-rotation element, and a fastening screw. The cutting insert may be mounted to the tool holder. The cutting insert may be removably secured to the insert receiving pocket of the tool holder. Referring to FIG. 5, a cutting tool 50 may generally comprise a tool holder 40 including an insert receiving pocket 41, at least one cutting insert 31-34, and a fastening screw 51 to removably secure each of the at least one cutting insert 31-34 to the insert receiving pocket of the tool body. As described above, each cutting insert 31-34 may comprise a top surface, a bottom surface, at least one side surface interconnecting the top surface and the bottom surface, at least one cutting edge, chip breaker geometry on each of the top surface and bottom surface, a through hole extending between the top surface and bottom surface, and at least one seat face, wherein each of the top surface and the bottom surface comprises an anti-rotation element. In various non-limiting embodiments, the cutting tool may comprise a milling cutter tool and a lathe.

In various non-limiting embodiments, the tool holder may comprise at least one insert receiving pocket configured to receive and/or support the cutting insert. The cutting insert may be mounted in the insert receiving pocket. For example, the cutting insert may be mounted in the insert receiving pocket such that a desired region of the cutting edge is oriented to contact a workpiece during machining. The cutting insert may be secured in the insert receiving pocket by a fastening screw. The insert receiving pocket may comprise a threaded fastening hole to receive the fastening screw. The fastening screw may removably secure the cutting insert to the tool holder, such as, for example, removably securing the cutting insert to the insert receiving pocket of the tool holder. In various non-limiting embodiments, the fastening screw may extend through the through hole of the cutting insert. The fastening screw may be received by a fastening hole of the insert receiving pocket. As shown in FIG. 5, the fastening screw 51 may extend through the through hole in the cutting insert into a threaded fastening hole 42 in the insert receiving pocket 41. In various non-limiting embodiments, the cutting insert may be secured to the cutting tool by a fastening screw, clamps, and/or a wedge.

In various non-limiting embodiments, the insert receiving pocket may comprise a support surface and a sidewall. At least one of the support surface and the sidewall may support the cutting insert when mounted to the tool holder. The side surface of the cutting insert may be received in the insert receiving pocket adjacent to the sidewall of the insert receiving pocket. For example, the side surface of the cutting insert may be received in the insert receiving pocket in a position adjoining the sidewall. In various non-limiting embodiments, the sidewall of the insert receiving pocket may support the side surface of the cutting insert. In various non-limiting embodiments, one of the top surface and bottom surface of the cutting insert may be received and supported by the support surface. As shown in FIG. 5, for example, the support surface 44 of the insert pocket may contact and support the bottom surface of the cutting insert, and the sidewalls 45, 46 may contact and support the side surface of the cutting insert.

In various non-limiting embodiments, the cutting tool may comprise up to 150 insert receiving pockets, each configured to receive a cutting insert. In various non-limiting embodiments, the cutting tool may comprise 1-150 insert receiving pockets, 1-125 insert receiving pockets, 1-100 insert receiving pockets, 1-50 insert receiving pockets, 1-25 insert receiving pockets, 1-10 insert receiving pockets, 1-5 insert receiving pockets, one insert receiving pocket, two, insert receiving pockets, three insert receiving pockets, four insert receiving pockets, five insert receiving pockets, six insert receiving pockets, seven insert receiving pockets, and eight insert receiving pockets. As shown in FIG. 5, for example, the tool holder may comprise four insert receiving pockets, each configured to receive a cutting insert.

In various non-limiting embodiments, the tool holder may comprise an insert receiving pocket comprising at least one recess. As shown in FIG. 5, in various non-limiting embodiments, the insert receiving pocket 41 may comprise a support surface 44 comprising a plurality of recesses 43 and at least one sidewall 45, 46. In various non-limiting embodiments, as shown in FIG. 5, the plurality of recesses may be evenly circumferentially spaced about the support surface in a radial arrangement. In various non-limiting embodiments, the recess may be configured to receive and/or support, and to cooperate with, all or a portion of the anti-rotation element. In various non-limiting embodiments, an anti-rotation element may be received and/or supported by a recess in the support surface such that the cutting insert is oriented so that a desired region of the cutting edge may contact a workpiece during machining operations. In various non-limiting embodiments, the recess may have a geometry complementary to the anti-rotation element. In various non-limiting embodiments, the recess may have a geometry non-complementary to the anti-rotation element.

In various non-limiting embodiments, the recess may comprise a support surface and a sidewall. In various non-limiting embodiments, the support surface of the recess may contact and/or support a planar surface of the anti-rotation element. In various non-limiting embodiments, the sidewall of the recess may contact and/or support at least one angled surface of the anti-rotation element. In various non-limiting embodiments, the cooperation between the anti-rotation element and recess may prevent rotation of the cutting insert when the anti-rotation element is received in the recess and the fastening screw is tightened. In various non-limiting embodiments, the cutting insert may be unable to rotate within the insert receiving pocket during machining.

In various non-limiting embodiments, referring to FIG. 6, a cutting tool 50 may generally comprise a tool holder 40 including a plurality of insert receiving pockets 41, a cutting insert 31 comprising an anti-rotation element 37 positioned in one of the plurality of insert receiving pockets 41, and a fastening screw 51 removably securing the cutting insert 31 to the tool holder 40. As shown in FIG. 7, the cutting insert 31 may comprise at least one seat face 38 on the top surface of the cutting insert and at least one seat face 66 on the bottom surface of the cutting insert. As shown FIG. 8, a support surface 44 of the insert receiving pocket 41 may contact and support the seat face 66 on the bottom surface of the cutting insert 31, and a sidewall of the insert receiving pocket may contact and support a side surface of the cutting insert 31. The anti-rotation element 62 may be positioned in the recess 65 of the insert receiving pocket 41. The support surface of the insert receiving recess may contact and support a planar surface of the anti-rotation element, and the sidewall of the insert receiving recess may contact and support the at least one angled surface of the anti-rotation element. In various non-limiting embodiments, the anti-rotation element 62 may contact the recess 65 at point P to prevent rotation of the cutting insert while mounted in the insert pocket.

Figure 9:
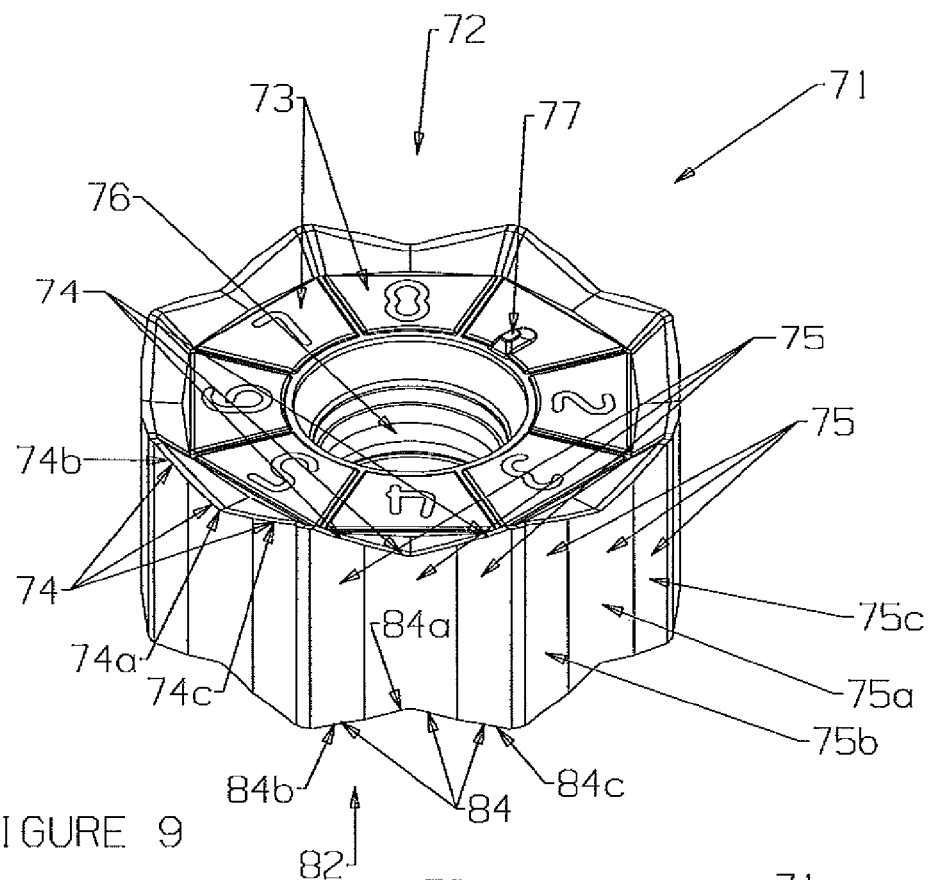
FIGS. 9 and 10 are perspective views illustrating non-limiting embodiments of a double-sided cutting insert according to the present disclosure.
Figure 10:
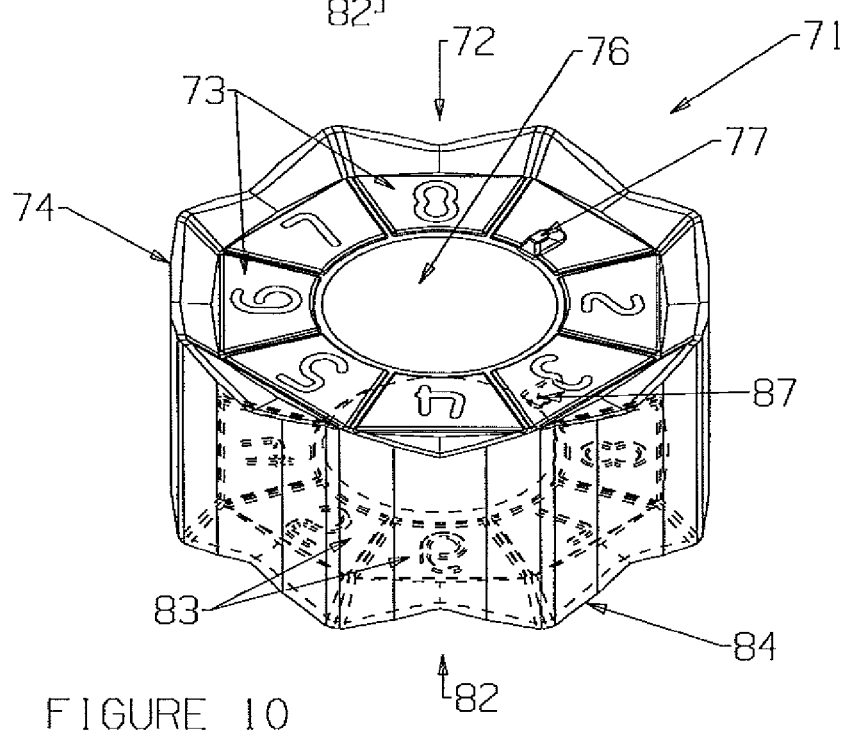

In various non-limiting embodiments, the cutting insert may generally comprise a double-sided octagonal cutting insert. Referring to FIGS. 9 and 10, the double-sided octagonal cutting insert 71 may generally comprise a top surface 72, a bottom surface 82, and at least one side surface interconnecting the top surface 72 and the bottom surface 82. At least one cutting edge 74 may be defined at the intersection between the top surface 72 and the side surface, and at least one cutting edge 84 may be defined at the intersection of the bottom surface 82 and the side surface. In various non-limiting embodiments, the cutting insert 71 may comprise at least one seat face 73 on the top surface 72 and at least one seat face 83 on the bottom surface 82. In various non-limiting embodiments, the cutting insert 71 may comprise a through hole 76 extending between the top surface and bottom surface. In various non-limiting embodiments, the cutting insert 71 may comprise the top surface 72 may comprise an anti-rotation element 77 and the bottom surface may comprise an anti-rotation element 87. In various non-limiting embodiments, the side surface extending between the top surface 72 and the bottom surface 82 may comprise a first portion 75*a* extending between cutting edge region 74*a* and cutting edge region 84*a*, a second portion 75*b* extending between cutting edge region 74*b* and cutting edge region 84*b*, and a third portion 75*c* extending between cutting edge region 74*c* and cutting edge region 84*c*.

Referring to FIGS. 9 and 10, in various non-limiting embodiments, the cutting insert 71 may comprise eight indexable regions of the cutting edge 74 on the top surface 72, and eight indexable regions of the cutting edge 84 on the bottom surface 82. In various non-limiting embodiments, the cutting edge 74 may comprise a first portion 74*a*, a second portion 74*b*, and a third portion 74*c*. The first portion 74*a* may be intermediate the second portion 74b and the third portion 74c. The cutting edge 84 may comprise a first portion 84a, a second portion 84b, and a third portion 84c. The first portion 84a may be intermediate the second portion 84b and third portion 84c. As shown in FIG. 10, in various non-limiting embodiments, the top surface 72 may be identical to the bottom surface 82. In various non-limiting embodiments, the cutting insert may comprise eight indexable cutting edges on the top surface and eight indexable cutting edges on the bottom surface.

Figure 11:
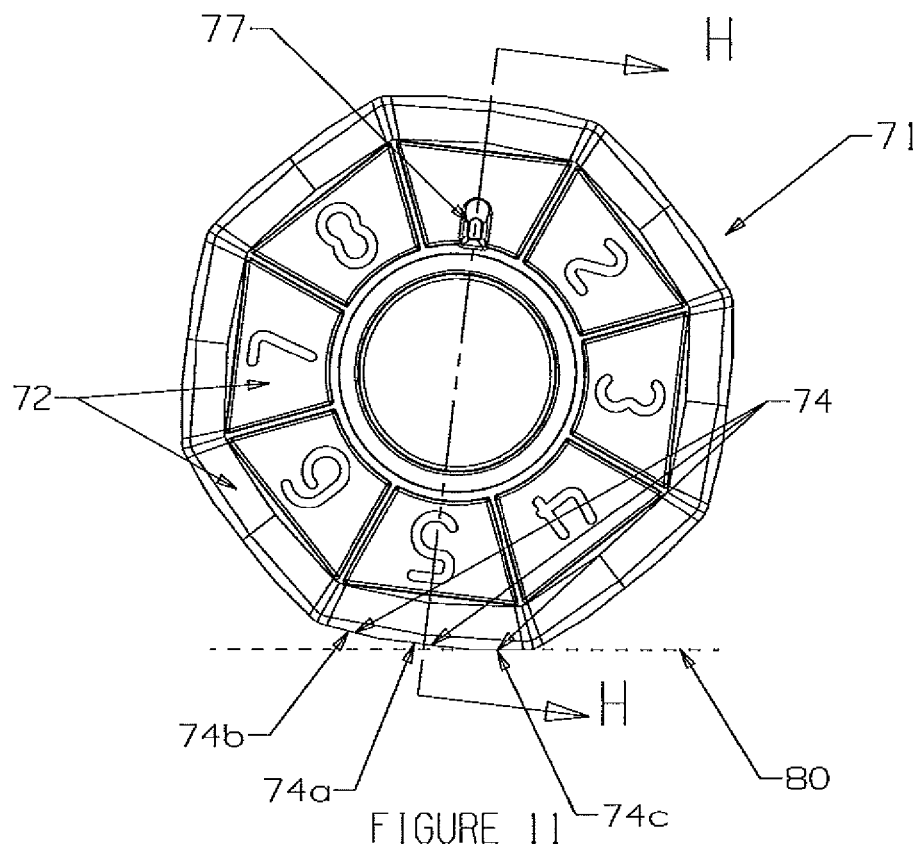
FIG. 11 is a top view of a non-limiting embodiment of a double-sided cutting insert according to the present disclosure.
Figure 12:
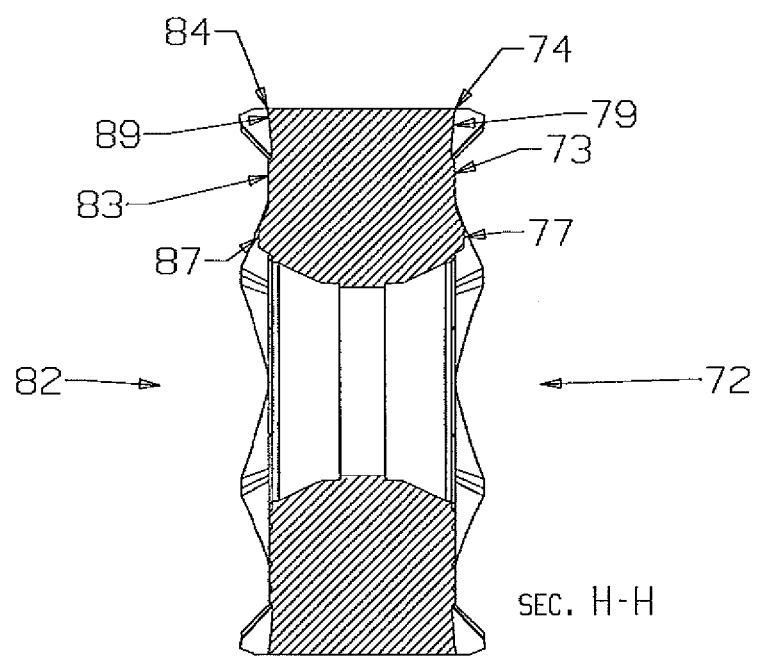
FIG. 12 is a sectioned view of the cutting insert illustrated in FIG. 11.

Referring to FIGS. 11 and 12, in various non-limiting embodiments, the cutting insert may generally comprise a double-sided octagonal cutting insert 71 comprising: a top surface 72; a bottom surface 82; at least one side surface interconnecting the top surface 72 and the bottom surface 82; at least one cutting edge 74 on the top surface 72; at least one cutting edge 84 on the bottom surface 82; at least one seat face 73 on the top surface 72; at least one seat face 83 on the bottom surface 82; chip breaker geometry 79 on the top surface 72; chip breaker geometry 89 on the bottom surface 82; a through hole 76 extending between the top surface and bottom surface; an anti-rotation element 77 on the top surface 72; and an anti-rotation element 87 on the bottom surface 82.

In various non-limiting embodiments, the cutting edge 74 may comprise eight indexable cutting edge regions, each comprising a first portion 74a intermediate a second portion 74b and a third portion 74c, and the cutting edge 84 may comprise eight indexable cutting edge regions, each comprising a first portion 84a intermediate a second portion 84b and a third portion 84c. When mounted and secured to a tool holder (not shown), at least one of the sixteen cutting edge regions may be oriented to contact and engage a workpiece. As shown in FIG. 11, in certain embodiments, the cutting insert 71 may be oriented such that the cutting edge region 74c contacts and engages the workpiece 80, and the cutting edge regions 74a and 74b do not contact and engage the workpiece 80 during machining. As described above, an operator may index the cutting insert 71 when the cutting edge region 74c becomes worn and/or damaged so that a different cutting edge region contacts and engages the workpiece 80.

Figure 13:
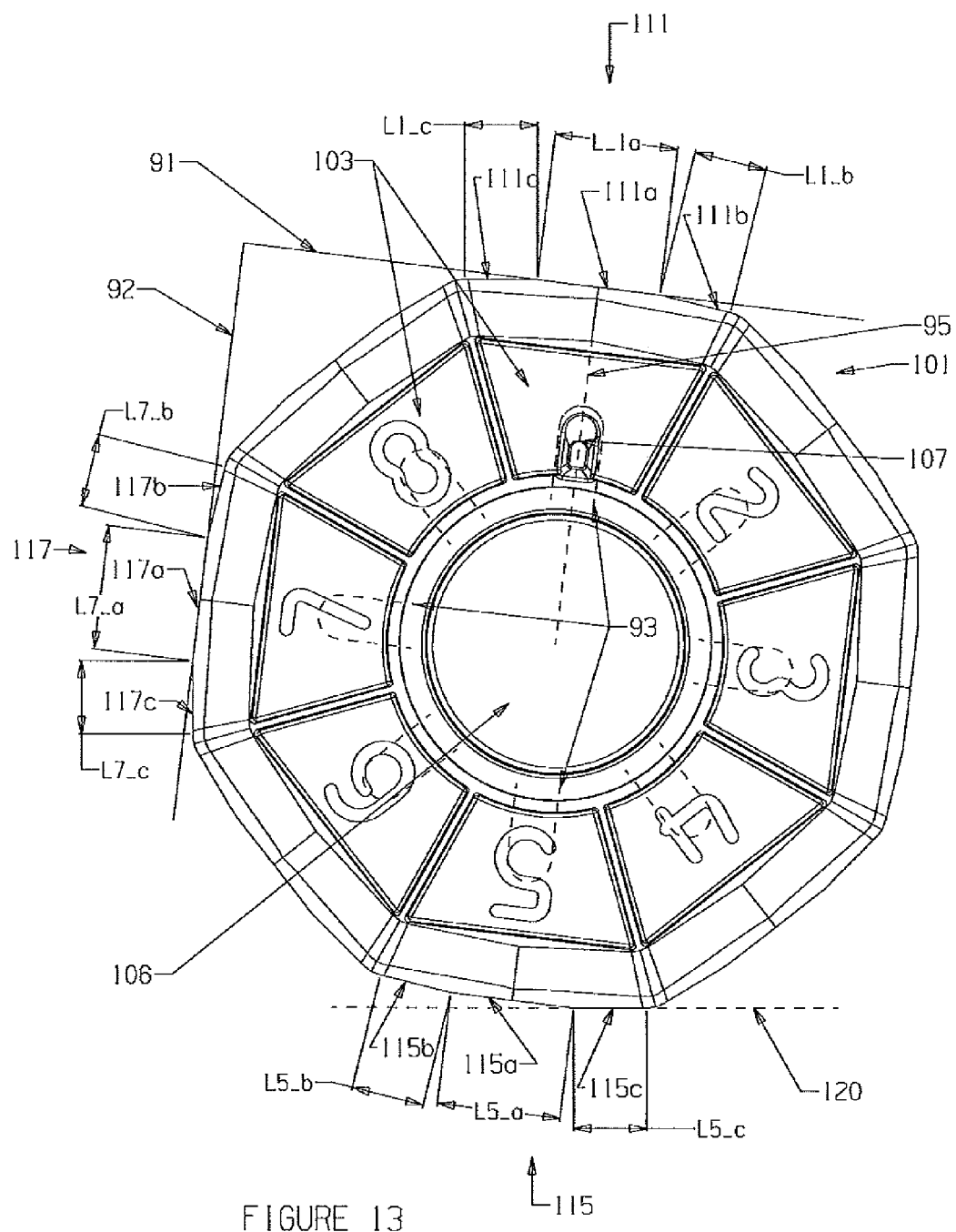
FIG. 13 is a top view of a non-limiting embodiment of a double-sided cutting insert according to the present disclosure.

In various non-limiting embodiments, referring to FIG. 13, a cutting tool may generally comprise a tool holder and a double-sided cutting insert 101. The tool holder may include an insert receiving pocket comprising at least one sidewall 91, 92 and a support surface comprising at least one recess 93. The double-sided cutting insert 101 may comprise: a top surface; a bottom surface; at least one side surface interconnecting the top surface and the bottom surface; at least one cutting edge on the top surface comprising a first portion, a second portion, and a third portion; at least one cutting edge on the bottom surface comprising a first portion, a second portion, and a third portion; at least one seat face on the top surface; at least one seat face on the bottom surface; a through hole extending between the top surface and bottom surface; an anti-rotation element disposed on the top surface; and an anti-rotation element disposed on the bottom surface. The anti-rotation element may be positioned in any one of the recesses 93.

In various non-limiting embodiments, at least one of the cutting edges may contact at least one sidewall of the insert receiving pocket. As shown in FIG. 13, the cutting edge 111 may contact the sidewall 91 wherein the first cutting edge portion 111a and sidewall of the cutting insert (not shown) contact the sidewall 91, and the cutting edge 117 may contact the sidewall 92 wherein the first cutting edge portion 117a and sidewall of the cutting insert (not shown) contact the sidewall 92. In various non-limiting embodiments, the cutting insert 101 may comprise eight indexable cutting edges regions 115 comprising a first portion 115a intermediate a second portion 115b and a third portion 115c. When mounted and secured to a tool holder (not shown), the cutting edge portion 115c may contact and engage the workpiece 120 and the cutting edge portions 115a and 115b may not contact and engage the workpiece 120 during machining.

In various non-limiting embodiments, referring to FIG. 13, the relationship among the indexable cutting edges may be generally described as follows: (1) the middle cutting edge portions (e.g., L111a, L117a and L115a) may be used to position the cutting insert against the sidewall, and $L\_1a=L\_7a=L\_5a$; (2) the non-middle cutting edge portions at the top surface (e.g., L111c, L117c and L115c) may be used to engage cutting edges when the top surface is used for machining and the bottom surface seats on the pocket support surface, and $L\_1c=L\_7c=L\_5c$; and (3) the non-middle cutting edge portions at the bottom surface corresponding to the non-middle cutting edge portions at the top surface may be used to engage cutting edges when the bottom surface is used for machining and the top surface seats on the pocket support surface, and $L\_1b=L\_7b=L\_5b$.

In various non-limiting embodiments, the cutting insert may comprise at least one cutting edge region comprising a plurality of cutting edge portions, wherein each portion of the cutting edge region may have the same length or a different length. When each cutting edge in a cutting insert lacking the anti-rotation element described herein comprises cutting edge portions having the same length or similar length, an operator may incorrectly position the cutting insert in the insert receiving pocket. For example, an operator may incorrectly position the cutting edge portion 111b instead of 111a in contact with the pocket wall 91, and consequently the cutting edge portion 117b may be in contact with the pocket wall 92 instead of 117a. As a result of incorrectly positioning the cutting insert, the middle cutting portion 115a engages the workpiece instead of the cutting edge portion 115c. However, a cutting insert comprising the anti-rotation element described herein may be prevented from being incorrectly positioned in the insert receiving pocket. In various non-limiting embodiments, for example, the cutting insert 101 may not seat flat on the support surface of the insert receiving pocket unless the anti-rotation element at the seating face is disposed in a recess 93, and thus the cutting insert would not be securely tightened by a fastening screw.

Figure 14:
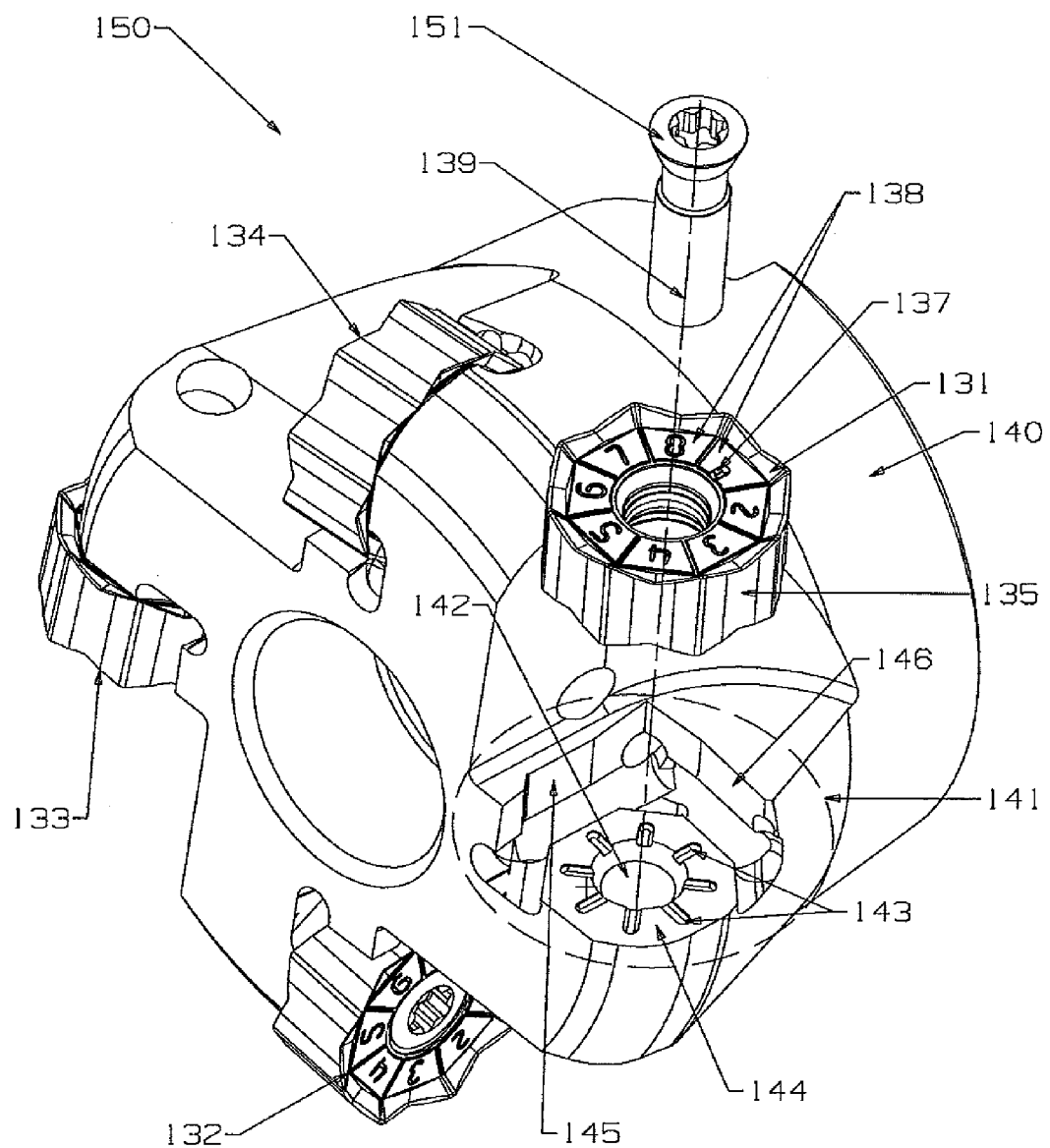
FIG. 14 is a perspective view illustrating a non-limiting embodiment of a cutting tool according to the present disclosure.

In various non-limiting embodiments, referring to FIG. 14, a cutting tool system 150 may generally comprise a tool holder 140 including a plurality of insert receiving pockets 141, at least one cutting insert 131-134 comprising an anti-rotation element 137 positioned in one of the plurality of insert receiving pockets 141, and a fastening screw 151 to removably secure the cutting insert 131 to the tool holder 140. The cutting insert 131 may comprise at least one seat face 138 on the top surface of the cutting insert and at least one seat face on the bottom surface of the cutting insert. The support surface 144 of the insert receiving pocket 141 may contact and support the seat face on the bottom surface (not shown) of the cutting insert, and the sidewalls 145, 146 of the insert receiving pocket may contact and support the side surfaces 135 of the cutting insert. The anti-rotation element 137 may be positioned in the recess. The anti-rotation element on the bottom surface (not shown) may fall inside one of the recesses 143 on the support surface 144.

Figure 15:
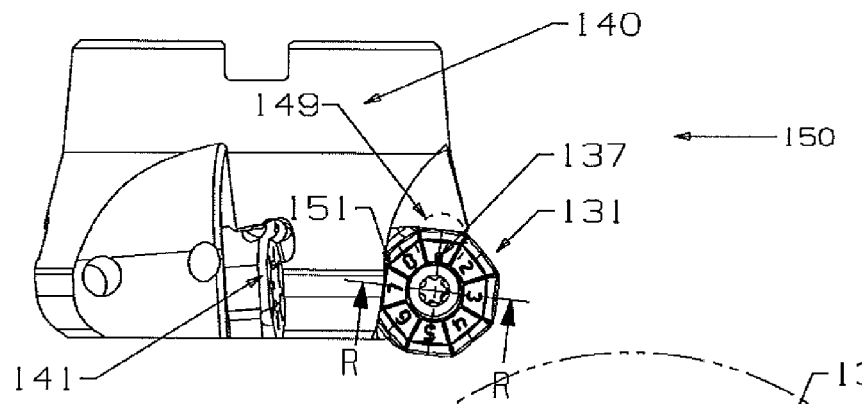
FIG. 15 is an elevational view illustrating a non-limiting embodiment of a cutting tool according to the present disclosure.
Figure 16:
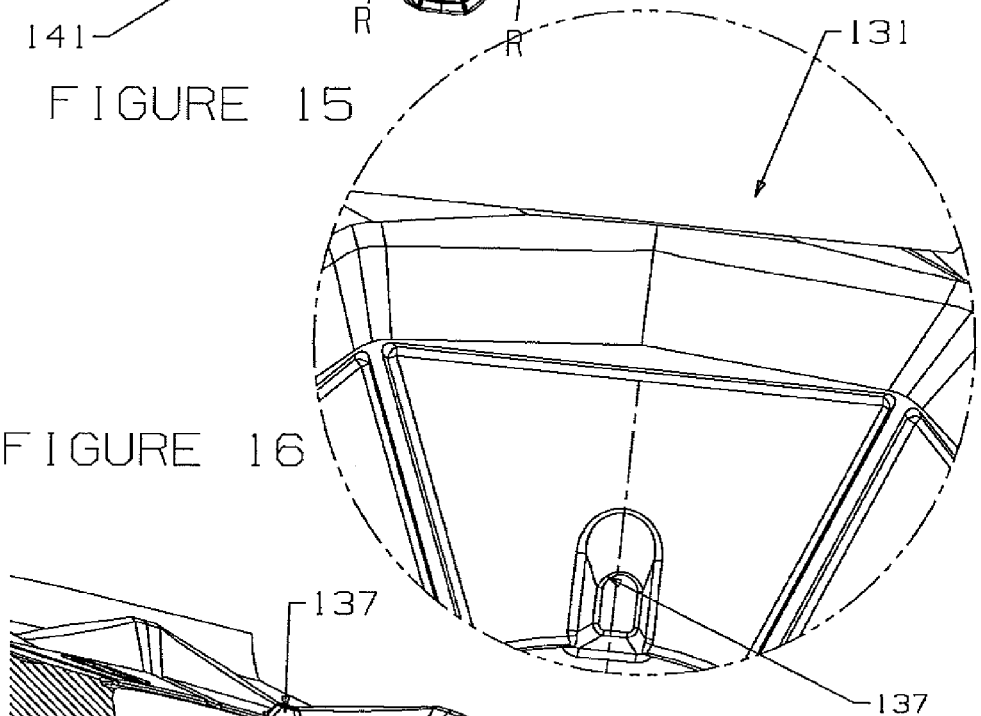
FIG. 16 is a detailed view of the cutting tool illustrated in FIG. 15.
Figure 17:
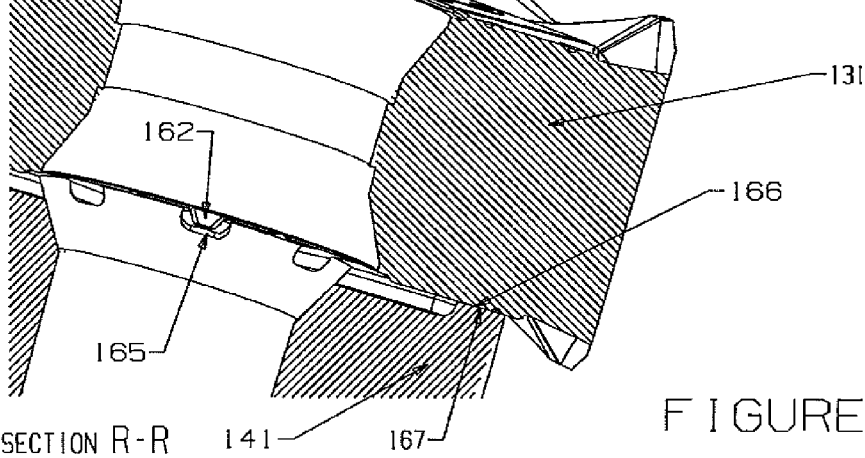
FIG. 17 is a sectioned view of the cutting tool illustrated in FIG. 15.

Referring to FIG. 15, a cutting tool 150 may generally comprise a tool holder 140 including a plurality of insert receiving pockets 141, a double-sided octagonal cutting insert 131 positioned in one of the plurality of insert receiving pockets 141, and a fastening screw 151 to secure the cutting insert to the tool holder 140. As shown in FIG. 16 (a detailed view of a circled area 149 in FIG. 15) and FIG. 17 (a sectioned view R-R), the seat face 166 on the bottom surface of the cutting insert 131 may contact and seat on the support surface 167 of the insert receiving pocket 141, and the anti-rotation element 162 on the bottom surface may fall inside the recess 165. As described above, the anti-rotation element may be positioned proximate to the through hole of the cutting insert.

In various non-limiting embodiments, a cutting insert comprising an anti-rotation element proximate to, adjacent to, adjoining, and/or contacting the through hole and spaced apart from the cutting edge may comprise cutting edges characterized by substantially identical and/or identical chip formation and/or machining performance. In various non-limiting embodiments, the anti-rotation element may not control chip formation when machining. In various non-limiting embodiments, the cutting insert may comprise at least one anti-rotation element and chip control geometry, wherein the chip control geometry does not comprise the at least one anti-rotation element. In various non-limiting embodiments, the at least one anti-rotation element may prevent rotation of the cutting insert when machining, but may not control chip formation.

Figure 18:
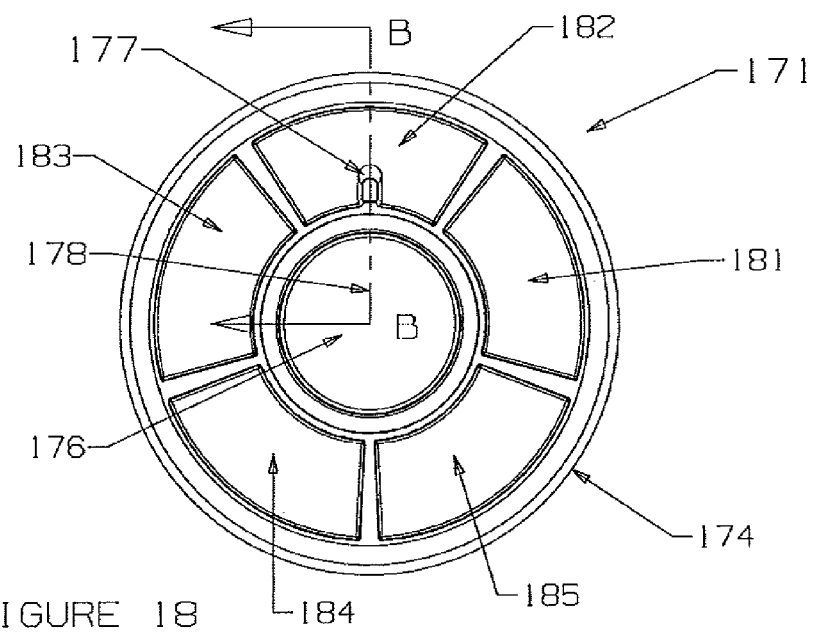
FIG. 18 is a top view of a non-limiting embodiment of a double-sided cutting insert according to the present disclosure.
Figure 19:
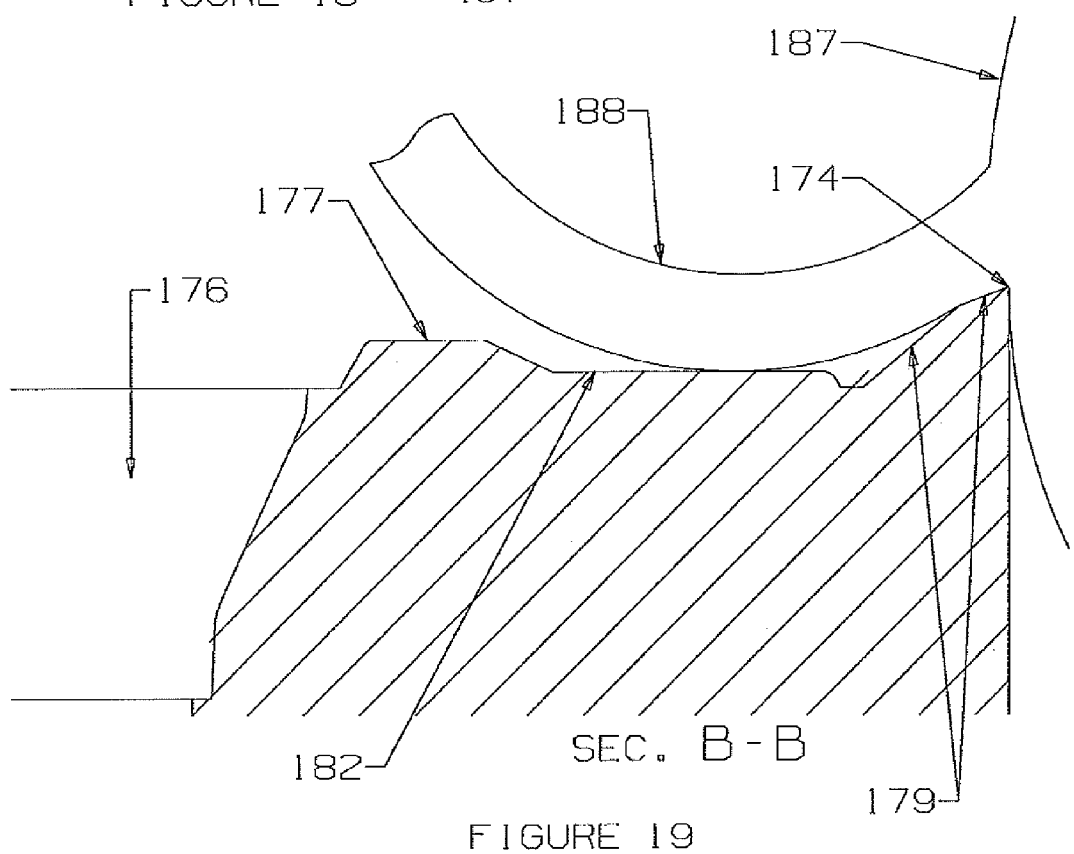
FIG. 19 is a sectioned view of the cutting insert illustrated in FIG. 18.

Referring to FIG. 18, a cutting insert 171 may generally comprise: a top surface; a bottom surface; at least one side surface interconnecting the top surface and the bottom surface and forming at least one indexable cutting edge 174; at least one seat face 181-185; and a through hole 176 extending between the top surface and bottom surface; wherein each of the top surface and bottom surface comprise an anti-rotation element 177 proximate to the through hole 176. As shown in FIG. 19 (a sectional view taken from the line 178 in FIG. 18), a chip 188 may be formed when a cutting edge 174 associated with seat face 182 contacts and engages a workpiece 187 during machining. The chip 188 may contact and flow downward along the chip breaker geometry 179 and contact the seat face 182. The chip 188 may not contact the anti-rotation element. The chip 188 may curl upward without contacting the anti-rotation element 177 when the chip 188 contacts the seat face 182.

In various non-limiting embodiments, the anti-rotation 177 element may not prevent the chip 188 from contacting the seat face 182. When the cutting insert is indexed to a different position, a chip may be formed when a cutting edge associated with any of seat faces 181, 183-185 engages a workpiece. The chip may contact the seat face lacking the anti-rotation element. Thus, a chip formed from cutting edge associated with a seat face 182 comprising the anti-rotation element 177 may be substantially identical and/or identical to a chip formed from a cutting edge associated with a seat faces 181, 183-185 lacking the anti-rotation element. In various non-limiting embodiments, the cutting insert 171 may comprise cutting edges characterized by substantially identical and/or identical chip formation, and/or machining performance.

Figure 20:
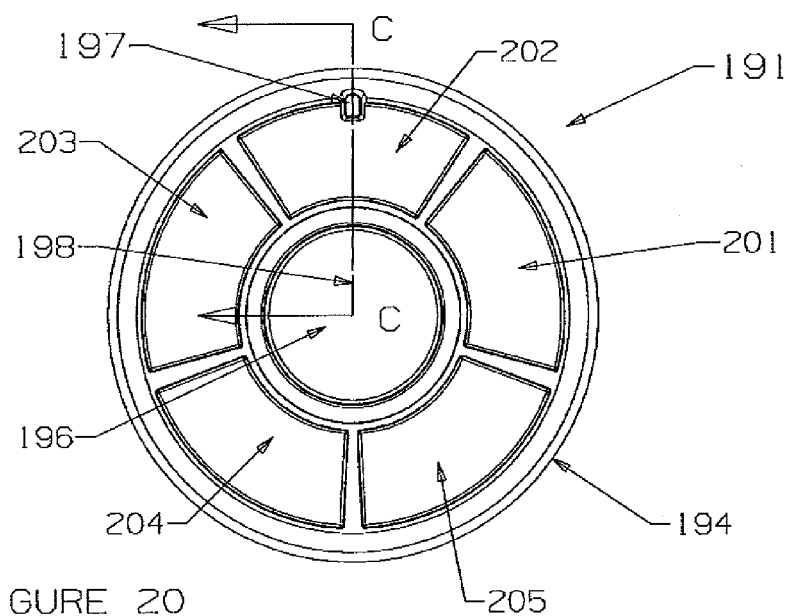
FIG. 20 is a top view of a double-sided cutting insert.
Figure 21:
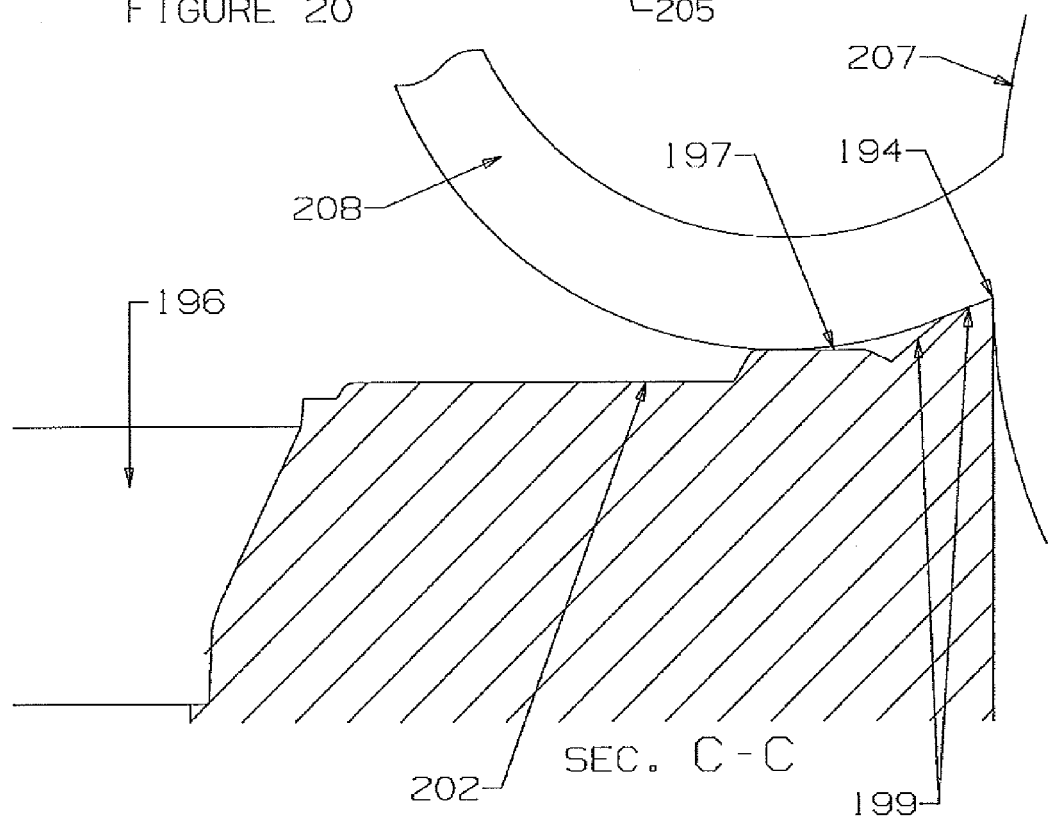
FIG. 21 is a sectioned view of the cutting insert illustrated in FIG. 20.

A cutting insert comprising an anti-rotation element proximate to the cutting edge and spaced apart from the through hole may comprise cutting edges characterized by different chip formation and/or machining performance. Referring to FIG. 20, a cutting insert 191 includes an anti-rotation element 197 proximate to the cutting edge 194 and spaced apart from the through hole 196. As shown in FIG. 20, one of the five seat faces 201-205 include the anti-rotation element 197. The anti-rotation element 197 is positioned along the centerline of the seat face 202. The anti-rotation element 197 protrudes from the top surface such that the height of the anti-rotation element 197 is greater than the seat face 202. As shown in FIG. 21 (a sectional view taken from the line 198 in FIG. 20), a chip 208 is formed when a cutting edge 194 associated with seat face 202 contacts and engages a workpiece 207 during machining. The chip 208 contacts the chip breaker geometry 199 and flows downward along the chip breaker geometry 199 and contacts the anti-rotation element 197. The chip 208 curls upward without contacting the seat face 202 when the chip 208 contacts the anti-rotation element 197. The anti-rotation element prevents the chip 208 from contacting the seat face 202. However, when the cutting insert is indexed to a different position, a chip is formed when a cutting edge region associated with any of seat faces 201, 203-205 engages a workpiece. The chip contacts the seat face lacking the anti-rotation element. Thus, a chip formed from the cutting edge region associated with the seat face 202 comprising the anti-rotation element 197 is different from a chip formed from a cutting edge region associated with the seat faces 201, 203-205 lacking the anti-rotation element, which is not desirable for a cutting insert including multiple indexable cutting edges.

Figure 23:
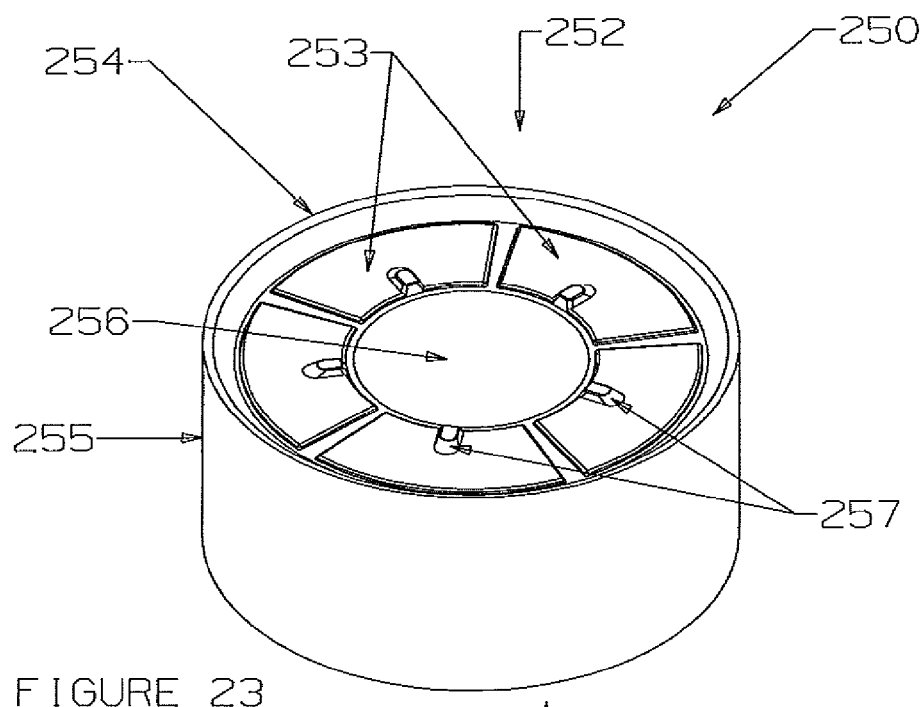
FIGS. 23 and 24 are perspective views of non-limiting embodiments of a double-sided cutting insert according to the present disclosure.
Figure 24:
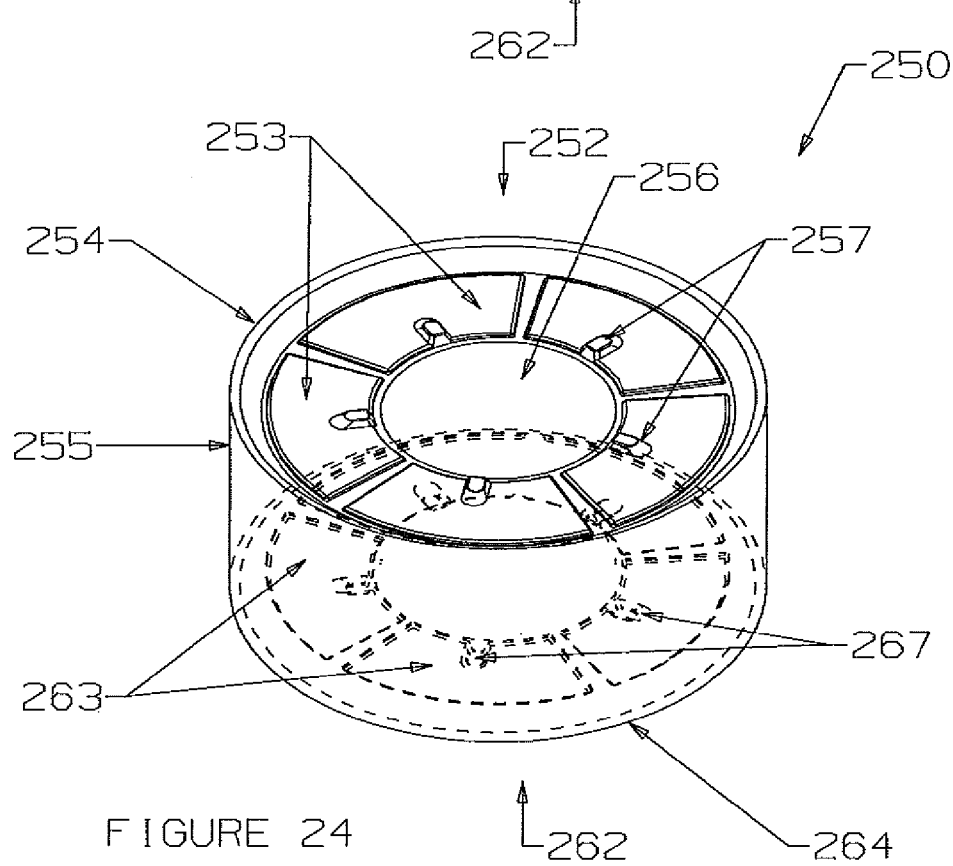

In various non-limiting embodiments, a cutting insert may comprise a plurality of anti-rotation elements. Referring to FIGS. 23 and 24, a double-sided cutting insert 250 may comprise: a top surface 252; a bottom surface 262; at least one side surface 255 interconnecting the top surface 252 and the bottom surface 262 and defining at least one cutting edge 254; at least one seating face 253; and a through hole 256 extending between the top surface 252 and bottom surface 262; wherein each of the top surface 252 and bottom surface 262 comprises a plurality of anti-rotation elements 257. Each anti-rotation element 257 may independently comprise any of the anti-rotation elements described above. For example, in various non-limiting embodiments, each seat face 253 may comprise an anti-rotation element. In various non-limiting embodiments, each anti-rotation element may be independently proximate to the through hole, adjacent the through hole, adjoining the through hole, and/or contacting the through hole, and spaced apart from the cutting edge.

Figure 22:
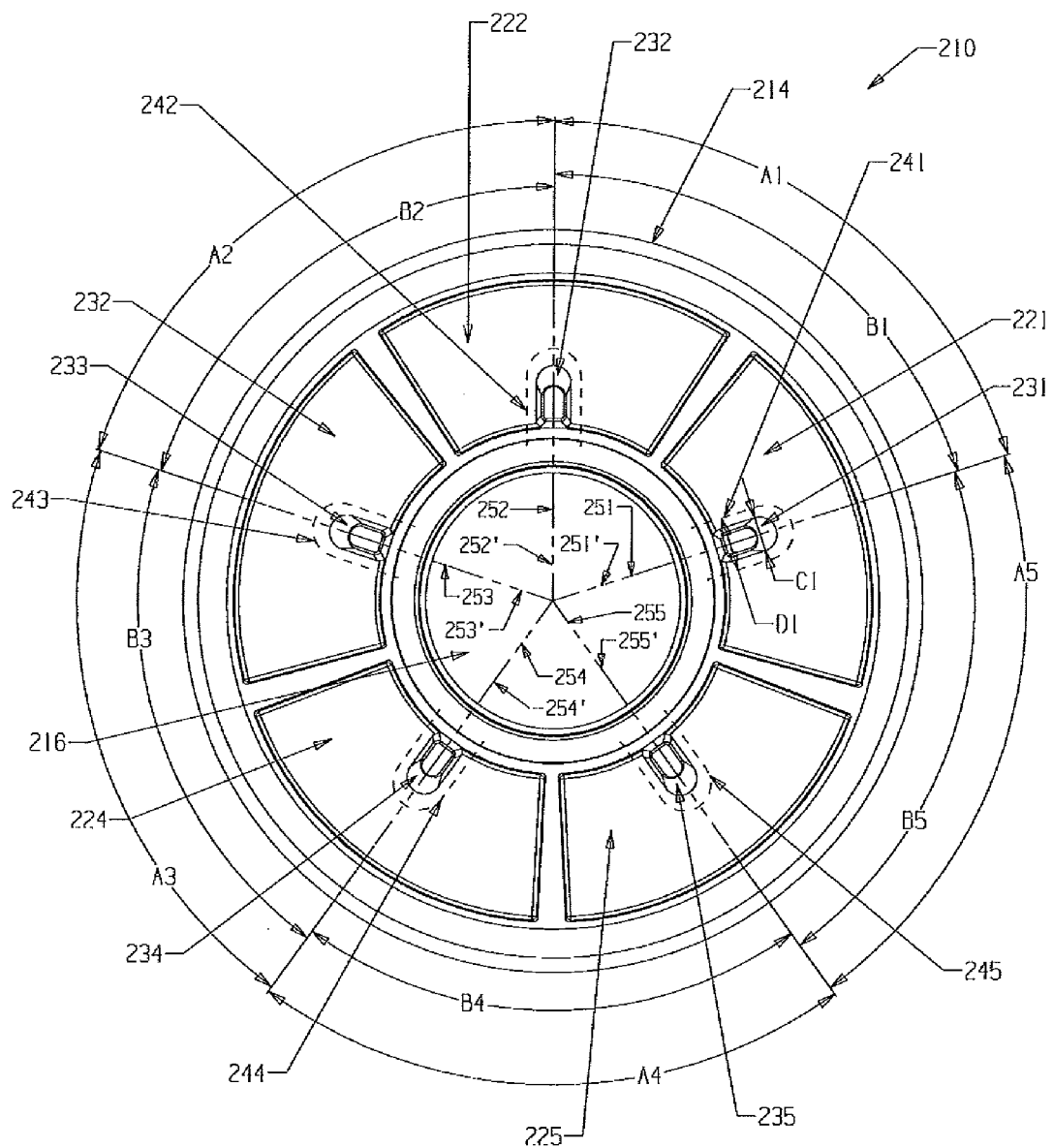
FIG. 22 is a top view of a non-limiting embodiment of a double-sided cutting insert according to the present disclosure.

In various non-limiting embodiments, a cutting insert comprising a top surface comprising a single anti-rotation element and a bottom surface comprising a single anti-rotation element may be characterized by a simpler manufacturing process and/or lower manufacturing cost relative to a cutting insert comprising a plurality of anti-rotation elements. Referring to FIG. 22, a double-sided round cutting insert 210 may comprise a plurality of seat faces 221, 222, 223, 224, and 225, and a plurality of anti-rotation elements 231, 232, 233, 234, and 235 on the top surface. Each of the plurality of anti-rotation elements 231, 232, 233, 234, and 235 may be independently positioned proximate to the through hole 216. The insert receiving pocket may comprise a plurality of recesses 241, 242, 243, 244, and 245. The top surface may be identical to the bottom surface. In various non-limiting embodiments, angles A1, A2, A3, A4, A5 formed between adjacent center lines 251, 252, 253, 254, 255, which correspond to anti-rotation elements 231, 232, 233, 234, 235, respectively, may be the same or different. In various non-limiting embodiments, angles B1, B2, B3, B4, B5 formed between adjacent center lines 251', 252', 253', 254', 255', which correspond to recesses 241, 242, 243, 244, and 245, respectively, may be the same or different. Referring to FIG. 22, for example, the angles A1, A2, A3, A4, A5 may be the same and/or the angles B1, B2, B3, B4, B5 may be the same.

In various non-limiting embodiments, a cutting insert comprising a plurality of anti-rotation elements and an insert pocket comprising a plurality of recesses may be characterized by a more precise manufacturing process relative to a cutting insert comprising a single anti-rotation element. For example, the angular tolerances between the plurality of anti-rotation elements and each of the plurality of recesses may be more precise relative to a single anti-rotation element. Referring to FIG. 22, in various non-limiting embodiments, a first dimensional tolerance may comprise an angular tolerance between the angles A1, A2, A3, A4, and A5 of the cutting insert and angles B1, B2, B3, B4, and B5 of the insert pocket. Each of the angles A1, A2, A3, A4, and A5 may be defined by the center line 251, 252, 253, 254, and 255, respectively. Each of angles B1, B2, B3, B4, and B5 may be defined by the center line 251', 252', 253', 254', and 255', respectively. In various non-limiting embodiments, a second dimensional tolerance may comprise a first dimension (C1) comprising the plurality of anti-rotation elements 231, 232, 233, 234, and 235 and a second dimension (D1) comprising the plurality of recesses 241, 242, 243, 244, and 245, respectively. In various non-limiting embodiments, a method of manufacturing a cutting insert comprising a plurality of anti-rotation elements may align angles A1, A2, A3, A4, and A5 of the cutting insert and angles B1, B2, B3, B4, and B5 and dimensions C1 and D1 within tighter tolerance relative to a cutting insert comprising a single anti-rotation element. In contrast, a cutting insert comprising a single anti-rotation element at or proximate to a center through hole on a single seat face may fit into any of the plurality of recesses when the single dimension C1 is controlled within the allowed dimensional tolerance of D1.

Figure 25:
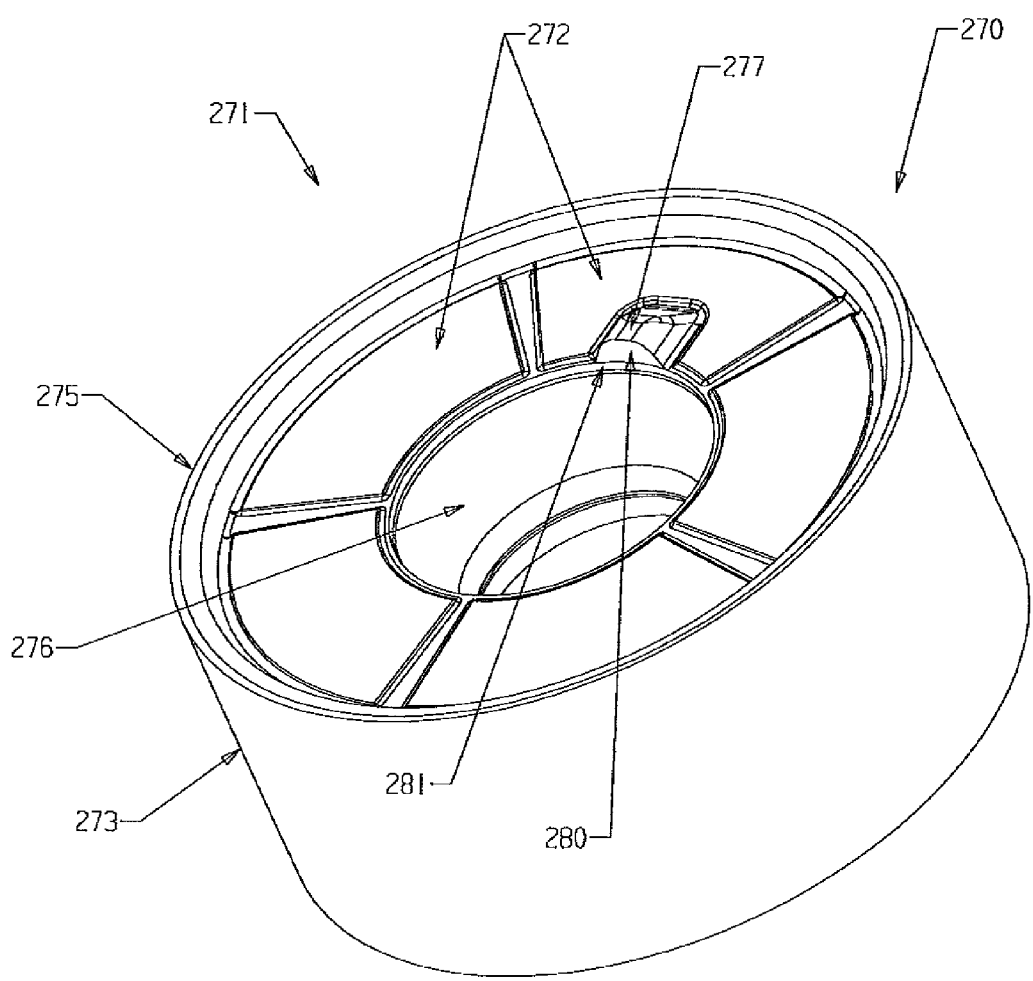
FIG. 25 is a perspective view of a non-limiting embodiment of a double-sided cutting insert according to the present disclosure.

FIG. 25 is a perspective view of a non-limiting embodiment of a double-sided cutting insert 270 according to the present disclosure. In various non-limiting embodiments, referring to FIG. 25, a double-sided cutting insert 270 may generally comprise: a top surface 271; a bottom surface (not shown); at least one side surface 273 interconnecting the top surface 271 and the bottom surface and defining at least one cutting edge 275; at least one seat face 272; and a through hole 276 extending between the top surface 272 and bottom surface; wherein each of the top surface 271 and bottom surface comprises a single anti-rotation element 277. The single anti-rotation element 277 may be proximate to the through hole 276, and/or adjoin the through hole 276. As shown in FIG. 25, for example, the surface 280 of the anti-rotation element 277 may adjoin the top peripheral surface 281 of the through hole 276.

In various non-limiting embodiments, a cutting tool may generally comprise: a tool holder comprising an insert receiving pocket comprising at least one recess; and a double-sided cutting insert. The double-sided cutting insert may comprise: a top surface; a bottom surface; at least one side surface interconnecting the top surface and the bottom surface and defining at least one cutting edge; and a through hole extending between the top surface and bottom surface; wherein each of the top surface and bottom surface comprises at least one anti-rotation element. The cutting insert may include an anti-rotation element arrangement wherein the at least one recess cooperates with and receives the anti-rotation element to prevent rotation of the cutting insert in the insert receiving pocket.

In various non-limiting embodiments, a method of machining may generally comprise providing a cutting tool comprising a tool holder including an insert receiving pocket comprising at least one recess, and a double-sided cutting insert. The cutting insert may comprise: a top surface; a bottom surface; at least one side surface interconnecting the top surface and the bottom surface and defining at least one cutting edge; and a through hole extending between the top surface and bottom surface. Each of the top surface and bottom surface may comprise at least one anti-rotation element, at least one seat face, and chip breaker geometry, wherein the anti-rotation element at least partially extends into the insert receiving pocket to prevent rotation of the cutting insert in the insert receiving pocket. The method may comprise contacting the workpiece with at least one cutting edge of the cutting insert to generate a chip, wherein the chip contacts the at least one seat face and does not contact the at least one anti-rotation element.

All documents cited herein are incorporated herein by reference, but only to the extent that the incorporated material does not conflict with existing definitions, statements, or other documents set forth herein. To the extent that any meaning or definition of a term in this disclosure conflicts with any meaning or definition of the same term in a document incorporated by reference, the meaning or definition assigned to that term in this disclosure shall govern. The citation of any document is not to be construed as an admission that it is prior art.

While particular embodiments have been illustrated and described herein, it those skilled in the art will understand that various other changes and modifications can be made without departing from the spirit and scope of the invention. Those skilled in the art will recognize, or be able to ascertain using no more than routine experimentation, numerous equivalents to the specific articles and methods described herein, including alternatives, variants, additions, deletions, modifications and substitutions. This disclosure, including the appended claims, is intended to cover all such equivalents that are within the spirit and scope of this invention.

What is claimed is:

1. A double-sided cutting insert comprising:
a top surface;
a bottom surface;
at least one side surface interconnecting the top surface and the bottom surface and defining at least one cutting edge; and
a cylindrical through hole extending between the top surface and bottom surface;
wherein each of the top surface and bottom surface comprise a plurality of seat faces evenly circumferentially spaced apart on each of the top surface and bottom surface; and
wherein each of the top surface and bottom surface comprise a single anti-rotation element adjoining the through hole, and
wherein a center line of the single anti-rotation element is substantially aligned with a center line of one of the plurality of seat faces.

2. The cutting insert of claim 1, wherein the top surface is identical to the bottom surface.

3. The cutting insert of claim 1 comprising an angle from 0° to about 180° formed between a plane perpendicular to the top surface and intersecting the top surface anti-rotation element and a plane perpendicular to the bottom surface and intersecting the bottom surface anti-rotation element.

4. The cutting insert of claim 3, wherein the angle is one of greater than 0° and not 0°.

5. The cutting insert of claim 1, wherein the top surface anti-rotation element is integral with the top surface and bottom surface anti-rotation element is integral with the bottom surface.

6. The cutting insert of claim 1, wherein the top surface anti-rotation element protrudes from the top surface and the bottom surface anti-rotation element protrudes from the bottom surface.

7. The cutting insert of claim 1, wherein the anti-rotation element comprises a flat surface and at least one angled surface sloping upwardly from one of the top surface and bottom surface towards the flat surface.

8. The cutting insert of claim 1, wherein an area of the single anti-rotation element is substantially less than an area of one of the plurality seat faces.

9. The cutting insert of claim 1 wherein each of the top surface and bottom surface comprises chip breaker geometry.

10. The cutting insert of claim 9, wherein the chip breaker geometry does not comprise the anti-rotation element.

11. The cutting insert of claim 1, wherein each cutting edge is indexable, and wherein the anti-rotation element indexes the cutting insert.

12. The cutting insert of claim 1 comprising a milling insert.

13. The cutting insert of claim 1 comprising one of a round-shaped cutting insert, a square-shaped cutting insert, a pentagon-shaped cutting insert, a hexagon-shaped cutting insert, a heptagon-shaped cutting insert, an octagon-shaped cutting insert, a decagon-shaped cutting insert, and a dodecagon-shaped cutting insert.

14. A cutting tool comprising:
a tool holder including an insert receiving pocket comprising at least one recess comprising a sidewall and a support surface for engaging the cutting insert; and
a double-sided cutting insert comprising
a top surface comprising a single top anti-rotation element;
a bottom surface comprising a single bottom anti-rotation element;
at least one side surface interconnecting the top surface and the bottom surface and defining at least one cutting edge; and
a cylindrical through hole extending between the top surface and bottom surface;
wherein each of the top surface and bottom surface comprise a plurality of seat faces evenly circumferentially spaced apart on each of the top surface and bottom surface; and
wherein a center line of the single anti-rotation element is substantially aligned with a center line of one of the plurality of seat faces; and
wherein the anti-rotation element is adjoining the through hole; and
wherein one of the anti-rotation elements at least partially extends into the insert receiving pocket to prevent rotation of the cutting insert in the insert pocket.

15. The cutting tool of claim 14, wherein the insert receiving pocket is configured to accommodate a round-shaped double-sided cutting insert and at least one polygon-shaped double-sided cutting insert.

16. The cutting tool of claim 14 comprising a plurality of recesses evenly circumferentially spaced about the insert receiving pocket.

17. An anti-rotation element arrangement between an insert receiving pocket comprising at least one recess in a tool holder and a double-sided cutting insert, and the cutting insert comprising a top surface, a bottom surface, at least one side surface interconnecting the top surface and the bottom surface and forming at least one cutting edge, a cylindrical through hole extending between the top surface and bottom surface, wherein each of the top surface and bottom surface comprise a plurality of seat faces evenly circumferentially spaced apart on each of the top surface and bottom surface; and wherein a center line of the single anti-rotation element is substantially aligned with a center line of one of the plurality of seat faces; and wherein each of the top surface and bottom surface comprise at least one anti-rotation element adjoining the through hole; and
wherein the at least one recess cooperates with and receives the anti-rotation element to prevent rotation of the cutting insert in the insert receiving pocket.

* * * * *